US011869431B2

(12) United States Patent
Han

(10) Patent No.: US 11,869,431 B2
(45) Date of Patent: Jan. 9, 2024

(54) POWER PROVIDER AND DISPLAY DEVICE INCLUDING THE SAME

(71) Applicant: Samsung Display Co., LTD., Yongin-si (KR)

(72) Inventor: Dong Kwan Han, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 17/849,334

(22) Filed: Jun. 24, 2022

(65) Prior Publication Data

US 2023/0138351 A1 May 4, 2023

(30) Foreign Application Priority Data

Nov. 2, 2021 (KR) ........................ 10-2021-0148871

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01); *G09G 2330/021* (2013.01); *G09G 2330/027* (2013.01); *G09G 2330/12* (2013.01)

(58) Field of Classification Search
CPC ......... G09G 3/3233; G09G 2300/0819; G09G 2300/0842; G09G 2310/08; G09G 2330/021; G09G 2330/027; G09G 2330/12
See application file for complete search history.

(56) References Cited

U.S. PATENT DOCUMENTS 7,443,641 B2 * 10/2008 Suzuki .................. H02M 3/156 361/18
8,174,802 B2 * 5/2012 Abe ...................... H02M 3/156 361/18
8,791,935 B2 * 7/2014 Park ..................... G09G 3/3233 345/212
9,058,773 B2 6/2015 Park
10,741,117 B2 * 8/2020 Park ......................... G09G 3/20
10,957,277 B2 3/2021 Lee et al.
(Continued)

FOREIGN PATENT DOCUMENTS

KR 10-1860739 B1 5/2018
KR 10-2019-0119243 A 10/2019
(Continued)

*Primary Examiner* — Jeff Piziali
(74) *Attorney, Agent, or Firm* — Lewis Roca Rothgerber Christie LLP

(57) ABSTRACT

A power provider includes: a first power converter to convert an input voltage, and output a first power voltage to a display panel through a first power line; a second power converter to convert the input voltage, and output a second power voltage to the display panel through a second power line; and a short circuit detecting circuit to detect a short-circuit of the first power line and the second power line in the display panel, by determining whether or not a level of a sensed voltage measured at the second power line is greater than or equal to a reference short circuit voltage level during a short circuit detecting period. The short circuit detecting circuit is to vary a length of the short circuit detecting period and the reference short circuit voltage level in response to a driving frequency.

20 Claims, 21 Drawing Sheets

(56) References Cited

U.S. PATENT DOCUMENTS

| | | | | |
|---|---|---|---|---|
| 11,094,280 | B2 | 8/2021 | Jang et al. | |
| 2012/0050346 | A1 * | 3/2012 | Sung | G09G 3/3233 345/690 |
| 2012/0293562 | A1 * | 11/2012 | Park | G09G 3/3233 345/212 |
| 2017/0245379 | A1 * | 8/2017 | Kang | G01R 31/52 |
| 2018/0033373 | A1 * | 2/2018 | Hong | G09G 3/325 |
| 2019/0172379 | A1 * | 6/2019 | Park | H02M 3/158 |
| 2020/0091709 | A1 * | 3/2020 | Park | H02H 9/02 |
| 2020/0175906 | A1 | 6/2020 | Lee et al. | |
| 2020/0294438 | A1 * | 9/2020 | Lee | G09G 3/20 |

FOREIGN PATENT DOCUMENTS

| | | | |
|---|---|---|---|
| KR | 10-2020-0067289 | A | 6/2020 |
| KR | 10-2021-0009713 | A | 1/2021 |

* cited by examiner

FIG. 19

| Driving frequency | 30 Hz | 60 Hz | 90 Hz | 120 Hz |
|---|---|---|---|---|
| 1frame time | 33.4 ms | 16.7 ms | 11.2 ms | 8.3 ms |
| TSSD | 25 ms | 10 ms | 8 ms | 5 ms |
| I_Lk | 1 mA | 1 mA | 1 mA | 1 mA |
| R_TR + Rfd | 100 mΩ | 100 mΩ | 100 mΩ | 100 mΩ |
| Vref_SSD | 100 mV | 100 mV | 80 mV | 50 mV |

<LUT>

POWER PROVIDER AND DISPLAY DEVICE INCLUDING THE SAME

CROSS-REFERENCE TO RELATED APPLICATION

This application claims priority to and the benefit of Korean Patent Application No. 10-2021-0148871, filed on Nov. 2, 2021, the entire disclosure of which is incorporated by reference herein.

BACKGROUND

1. Field

Aspects of embodiments of the present disclosure relate to a power provider, and a display device including the same.

2. Description of the Related Art

A display device may include a power provider that converts input power supplied from the outside to generate high potential output power and low potential output power used to drive pixels. The power provider may supply the generated high potential output power and low potential output power to a display panel of the display device through a power line.

The above information disclosed in this Background section is for enhancement of understanding of the background of the present disclosure, and therefore, it may contain information that does not constitute prior art.

SUMMARY

A display device may include a short circuit detecting circuit to detect whether or not a short circuit occurs between a high potential output power line (or a first power line) and a low potential output power line (or a second power line) when the display panel is started. The short circuit detecting circuit may operate a comparator after a suitable period (e.g., a predetermined period) has elapsed to compare a voltage level of the low potential output power with a reference short circuit voltage level. When the voltage level of the low potential output power is greater than the reference short circuit voltage level, the power provider may not convert the input power to the output power.

On the other hand, when a driving frequency of the display device is increased, a period of one frame may be shortened. Therefore, even during high frequency driving, when an operating time point of the comparator is the same as that of low frequency driving, even if a short circuit occurs in the display panel, because the low potential output power starts to be output before the voltage level of the low potential output power reaches the reference short circuit voltage level, the short circuit detecting circuit may not operate properly.

According to one or more embodiments of the present disclosure, a power provider and a display device including the power provider may be provided that may normally operate a short circuit detecting circuit even when a driving frequency is changed.

According to one or more embodiments of the present disclosure, a power provider and a display device including the power provider may be provided that may maintain or substantially maintain a leakage current of a short circuit detecting circuit at a constant or substantially constant level.

According to one or more embodiments of the present disclosure, a power provider and a display device including the power provider may be provided that may maintain or substantially maintain a constant or substantially constant discharging time of an output capacitor (e.g., a capacitor connected between a second power output terminal and ground) during power-off after normal operation.

According to one or more embodiments of the present disclosure, a power provider includes: a first power converter configured to convert an input voltage, and output a first power voltage to a display panel through a first power line; a second power converter configured to convert the input voltage, and output a second power voltage to the display panel through a second power line; and a short circuit detecting circuit configured to detect a short-circuit of the first power line and the second power line in the display panel, by determining whether or not a level of a sensed voltage measured at the second power line is greater than or equal to a reference short circuit voltage level during a short circuit detecting period. The short circuit detecting circuit is configured to vary a length of the short circuit detecting period and the reference short circuit voltage level in response to a driving frequency.

In an embodiment, the first power converter may include: a boost converter configured to receive the input voltage from a first input terminal, and output the first power voltage to a first output terminal; a switch connected between the first input terminal and the first output terminal; and a soft start controller configured to control the switch based on a first control signal.

In an embodiment, the soft start controller may be configured to turn on the switch when the first control signal is received, and output a first pre-charge end signal at a time point at which the switch is turned off.

In an embodiment, the second power converter may include a control transistor and a variable resistance connected in series between a second output terminal and ground, the second output terminal being connected to the second power line.

In an embodiment, an equivalent resistance may have a larger resistance in the short circuit detecting period than that of a discharge period in which a voltage of the second power line is discharged to ground during power-off, the equivalent resistance corresponding to a sum of a resistance of the control transistor and the variable resistance.

In an embodiment, the variable resistance may include: a first resistance and a second resistance connected in series; and a first switch connected to opposite ends of the second resistance in parallel with the second resistance.

In an embodiment, the first switch may be configured to be turned off during the short circuit detecting period, and turned on during a discharge period.

In an embodiment, the variable resistance may include: a third resistance and a fourth resistance connected in parallel; and a second switch connected between one end of the third resistance and one end of the fourth resistance.

In an embodiment, the second switch may be configured to be turned off during the short circuit detecting period, and turned on during a discharge period.

In an embodiment, the second power converter may further include a diode between the second output terminal and ground.

In an embodiment, the short circuit detecting circuit may include: a comparator configured to receive the sensed voltage and the reference short circuit voltage, and output a logic high level signal when the level of the sensed voltage is greater than the reference short circuit voltage level; a short circuit detecting controller configured to provide a voltage of a turn-on level to a gate electrode of a control transistor when the logic high level signal is received; and a delay part configured to receive the first pre-charge end signal from the first power converter.

In an embodiment, the delay part may be configured to delay the first pre-charge end signal by a delay period to output a sensing enable signal.

In an embodiment, the comparator may be configured to compare the level of the sensed voltage with the reference short circuit voltage level when the sensing enable signal is received.

In an embodiment, the reference short circuit voltage level may be decreased when the driving frequency increases.

In an embodiment, the delay part may be configured to decrease the delay period when the driving frequency increases.

In an embodiment, the short circuit detecting period may be defined as a period from a time point at which the first control signal is applied to a time point at which the sensing enable signal ends.

According to one or more embodiments of the present disclosure, a display device includes: a display panel including: scan lines; a first power line; a second power line; and pixels connected to the scan lines, the first power line, and the second power line; a scan driver configured to sequentially output scan signals to the scan lines; and a power provider including: a first power converter configured to convert an input voltage to output a first power voltage to the display panel through the first power line; a second power converter configured to convert the input voltage to output a second power voltage to the display panel through the second power line; and a short circuit detecting circuit configured to detect a short-circuit of the first power line and the second power line in the display panel, by determining whether or not a level of a sensed voltage measured at the second power line is greater than or equal to a reference short circuit voltage level during a short circuit detecting period. The short circuit detecting circuit is configured to vary a length of the short circuit detecting period and the reference short circuit voltage level in response to a driving frequency.

In an embodiment, the second power converter may include a control transistor and a variable resistance connected in series between a second output terminal and ground, the second output terminal being connected to the second power line.

In an embodiment, an equivalent resistance may have a larger resistance in the short circuit detecting period than that of a discharge period in which a voltage of the second power line is discharged to ground during power-off of the power provider, the equivalent resistance corresponding to a sum of a resistance of the control transistor and the variable resistance.

In an embodiment, the short circuit detecting circuit may be configured to decrease a length of the short circuit detecting period and decreases the reference short circuit voltage level, when the driving frequency increases.

According to one or more embodiments of the present disclosure, a power provider and a display device including the power provider may be provided in which it may be possible to normally operate a short circuit detecting circuit even if a driving frequency is changed, by varying a comparator operation time point and a reference short circuit voltage level in response to the driving frequency.

According to one or more embodiments of the present disclosure, a power provider and a display device including the power provider may be provided in which a discharging resistance of a short circuit detecting circuit may be varied differently for each detecting period and discharging period, and thus, it may be possible to maintain or substantially maintain a leakage current of the short circuit detecting circuit at a constant or substantially constant level, and it may be possible to maintain or substantially maintain a constant or substantially constant discharging time of an output capacitor (e.g., a capacitor connected between a second power output terminal and ground) during power-off after normal operation.

BRIEF DESCRIPTION OF THE DRAWINGS

FIG. 19 is a lookup table corresponding to a short circuit detecting period and a reference short circuit voltage level for various driving frequencies according to an embodiment.

DETAILED DESCRIPTION

Figure 1:
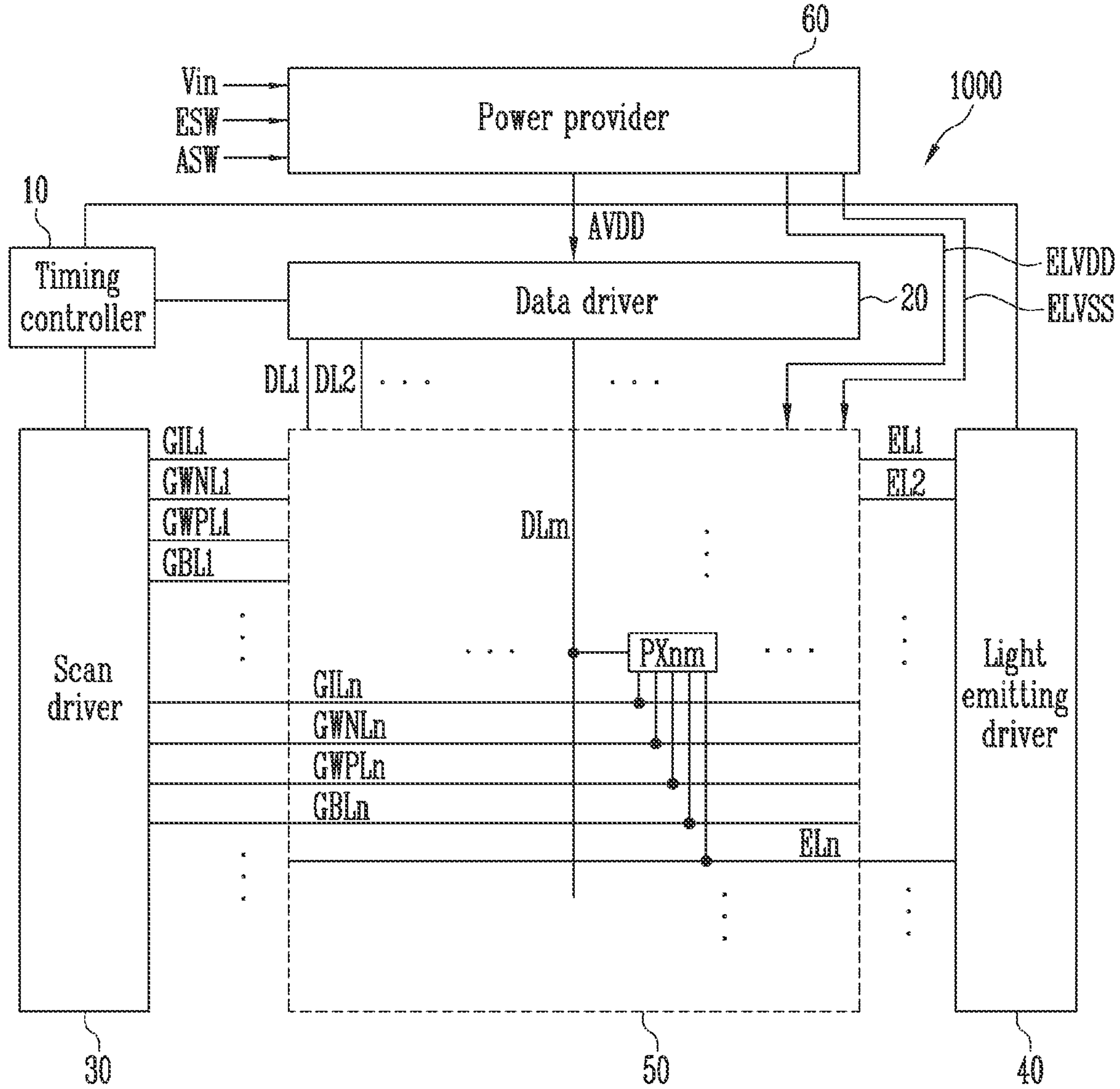
FIG. 1 is a drawing illustrating a display device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. For example, when an electrode or line is described as being connected to another electrode or line, the electrode or line may be directly connected to the other electrode or line, or the electrode or line may be indirectly connected to the other electrode or line via one or more intervening elements. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a drawing illustrating a display device according to an embodiment of the present disclosure.

Referring to FIG. 1, a display device 1000 according to an embodiment may include a timing controller 10, a data driver 20, a scan driver 30, a light emitting driver 40, a display panel 50, and a power provider (e.g., a power supply or power supply device) 60.

The timing controller 10 may receive an external input signal from an external processor. The external input signal may include a horizontal synchronization signal (Hsync), a vertical synchronization signal (Vsync), a data enable signal, an RGB data signal, and/or the like.

The vertical synchronization signal may include a plurality of pulses, and may indicate when a previous frame period ends and a current frame period begins based on a time point at which each pulse is generated. An interval between adjacent pulses of the vertical synchronization signal may correspond to one frame period. The horizontal synchronization signal may include a plurality of pulses, and may indicate when a previous horizontal period ends and a new horizontal period begins based on a time point at which each pulse is generated. An interval between adjacent pulses of the horizontal synchronization signal may correspond to one horizontal period. The data enable signal may have an enable level for certain (e.g., specific) horizontal periods, and may have a disable level for the remaining periods. The data enable signal having the enable level may indicate that the RGB data signal is supplied in corresponding horizontal periods. The RGB data signal may be supplied in units of pixel rows in respective corresponding horizontal periods. The timing controller 10 may generate grayscale values based on the RGB data signal to correspond to a specification of the display device 1000. The timing controller 10 may generate control signals to be supplied to the data driver 20, the scan driver 30, the light emitting driver 40, and the like based on an external input signal to correspond to the specification of the display device 1000.

The power provider 60 receives an input voltage Vin from a battery or the like, and converts the input voltage Vin, thereby providing a first power voltage ELVDD, a second power voltage ELVSS, and a third power voltage AVDD. The power provider 60 may receive a first control signal ESW, and may provide the first power voltage ELVDD and the second power voltage ELVSS based on the first control signal ESW. The power provider 60 may receive a second control signal ASW, and may provide the third power voltage AVDD based on the second control signal ASW. The power provider 60 may receive the first control signal ESW and the second control signal ASW from at least one of the timing controller 10, the data driver 20, and an external processor. For example, the power provider 60 may be configured as a power management integrated chip (PMIC).

The data driver 20 may generate data voltages to be provided to data lines DL1, DL2, and DLm, where m is an integer greater than zero, by using the grayscale values and the control signals received from the timing controller 10. For example, the data driver 20 may sample grayscale values by using a clock signal, and may supply data voltages corresponding to the grayscale values to the data lines DL1, DL2, and DLm in units of the pixel rows (e.g., the pixels connected to the same scan line).

The scan driver 30 may receive a clock signal, a scan start signal, and the like from the timing controller 10 to generate scan signals to be provided to scan lines GIL1, GWNL1, GWPL1, GBL1, GILn, GWNLn, GWPLn, and GBLn, where n may be an integer greater than zero.

The scan driver 30 may include a plurality of sub-scan drivers. For example, a first sub-scan driver may provide scan signals for the scan lines GIL1 and GILn, a second sub-scan driver may provide scan signals for the scan lines GWNL1 and GWNLn, a third sub-scan driver may provide scan signals for the scan lines GWPL1 and GWPLn, and a fourth sub-scan driver may provide scan signals for the scan lines GBL1 and GBLn. Respective sub-scan drivers may include a plurality of scan stages connected to each other in a form of a shift register. For example, the scan signals may be generated by sequentially transmitting a pulse having a turn-on level of a scan start signal supplied to a scan start line to a next scan stage.

As another example, the first and second sub-scan drivers may be integrated with each other to provide the scan signals for the scan lines GIL1, GWNL1, GILn, and GWNLn, and the third and fourth sub-scan drivers may be integrated with each other to provide the scan signals for the scan lines GWPL1, GBL1, GWPLn, and GBLn. For example, a previous scan line (e.g., an (n−1)-th scan line) of the n-th scan line GWNLn may be connected to the same electrical node together with the n-th scan line GILn. In addition, for example, a next scan line (e.g., an (n+1)-th scan line) of the n-th scan line GWPLn may be connected to the same electrical node together with the n-th scan line GBLn.

In this case, the first and second sub-scan drivers may supply scan signals having pulses of a first polarity to the scan lines GIL1, GWNL1, GILn, and GWNLn. In addition, the third and fourth sub-scan drivers may supply scan signals having pulses of a second polarity to the scan lines GWPL1, GBL1, GWPLn, and GBLn. The first polarity and the second polarity may be opposite to each other.

Hereinafter, the term "polarity" may be used to refer to a logic level of a pulse. For example, when a pulse has the first polarity, the pulse may have a high level. In this case, the high level pulse may be referred to as a rising pulse. When the rising pulse is supplied to a gate electrode of an N-type transistor, the N-type transistor may be turned on. In other words, the rising pulse may be a turn-on level for the N-type transistor. Here, it is assumed that a sufficiently low level voltage is applied to a source electrode of the N-type transistor when compared with the gate electrode thereof. For example, the N-type transistor may be an NMOS transistor.

In addition, when a pulse has the second polarity, the pulse may have a low level. In this case, the low level pulse may be referred to as a falling pulse. When the falling pulse is supplied to a gate electrode of a P-type transistor, the P-type transistor may be turned on. In other words, the falling pulse may be a turn-on level for the P-type transistor. Here, it is assumed that a sufficiently high level voltage is applied to a source electrode of the P-type transistor when compared with the gate electrode thereof. For example, the P-type transistor may be a PMOS transistor.

The light emitting driver 40 may receive a clock signal, a light emitting stop signal, and the like from the timing controller 10 to generate light emitting signals to provide to light emitting lines EL1, EL2, and ELn. For example, the light emitting driver 40 may sequentially provide the light emitting signals having a pulse of a turn-off level to the light emitting lines EL1, EL2, and ELn. For example, the light emitting driver 40 may be configured in a form of a shift register, and may generate the light emitting signals in a manner that sequentially transmits a turn-off level pulse of a light emitting stop signal to a next light emitting stage according to control of a clock signal.

The display panel 50 includes a plurality of pixels PX. For example, a pixel PXnm may be connected to a corresponding data line DLm, corresponding scan lines GILn, GWNLn, GWPLn, and GBLn, and a corresponding light emitting line ELn.

Figure 2:
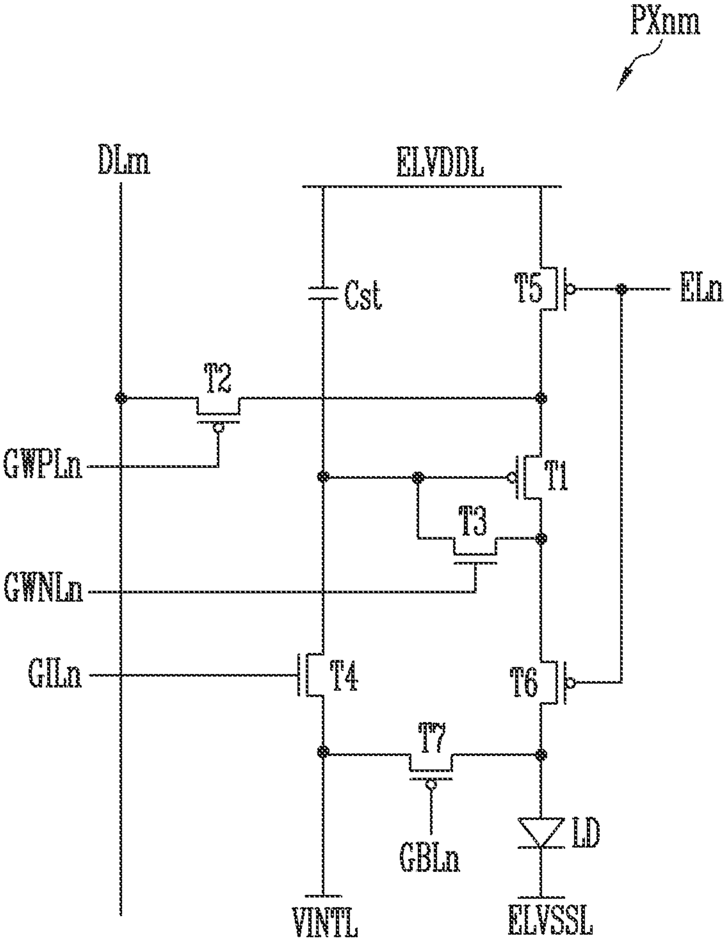
FIG. 2 is a drawing illustrating a pixel according to an embodiment of the present disclosure.

FIG. 2 is a drawing illustrating a pixel according to an embodiment of the present disclosure.

Referring to FIG. 2, the pixel PXnm according to an embodiment of the present disclosure includes a plurality of transistors T1, T2, T3, T4, T5, T6, and T7, a storage capacitor Cst, and a light emitting element LD.

A first electrode of the first transistor T1 may be connected to a first electrode of the second transistor T2, a second electrode of the first transistor T1 may be connected to a first electrode of the third transistor T3, and a gate electrode of the first transistor T1 may be connected to a second electrode of the third transistor T3. The first transistor T1 may be referred to as a driving transistor.

The first electrode of the second transistor T2 may be connected to the first electrode of the first transistor T1, a second electrode of the second transistor T2 may be connected to a data line DLm, and a gate electrode of the second transistor T2 may be connected to a scan line GWPLn. The second transistor T2 may be referred to as a scan transistor.

The first electrode of the third transistor T3 may be connected to the second electrode of the first transistor T1, the second electrode of the third transistor T3 may be connected to the gate electrode of the first transistor T1, and a gate electrode of the third transistor T3 may be connected to a scan line GWNLn. The third transistor T3 may diode-connect the first transistor T1 when the third transistor T3 is turned on. The third transistor T3 may be referred to as a diode-connection transistor.

A first electrode of the fourth transistor T4 may be connected to a second electrode of the capacitor Cst, a second electrode of the fourth transistor T4 may be connected to an initialization line VINTL, and a gate electrode of the fourth transistor T4 may be connected to a scan line GILn. The fourth transistor T4 may be referred to as a gate initialization transistor.

A first electrode of the fifth transistor T5 may be connected to a first power line ELVDDL, a second electrode of the fifth transistor T5 may be connected to the first electrode of the first transistor T1, and a gate electrode of the fifth transistor T5 may be connected to a light emitting line ELn. The fifth transistor T5 may be referred to as a first light emitting transistor.

A first electrode of the sixth transistor T6 may be connected to the second electrode of the first transistor T1, a second electrode of the sixth transistor T6 may be connected to an anode of the light emitting element LD, and a gate electrode of the sixth transistor T6 may be connected to the light emitting line ELn. The sixth transistor T6 may be referred to as a second light emitting transistor.

A first electrode of the seventh transistor T7 may be connected to the anode of the light emitting element LD, a second electrode of the seventh transistor T7 may be connected to the initialization line VINTL, and a gate electrode of the seventh transistor T7 may be connected to a scan line GBLn. The seventh transistor T7 may be referred to as an anode initialization transistor.

A first electrode of the storage capacitor Cst may be connected to the first power line ELVDDL, and the second electrode of the storage capacitor Cst may be connected to the gate electrode of the first transistor T1.

The anode of the light emitting element LD may be connected to the second electrode of the sixth transistor T6, and a cathode of the light emitting element LD may be connected to a second power line ELVSSL. A voltage applied to the second power line ELVSSL may be lower than that applied to the first power line ELVDDL. The light emitting element LD may be an organic light emitting diode, an inorganic light emitting diode, or a quantum dot light emitting diode.

The transistors T1, T2, T5, T6, and T7 may be P-type transistors. Channels of the transistors T1, T2, T5, T6, and T7 may include (e.g., may be made of) polysilicon. The polysilicon transistor may be a low temperature polysilicon (LTPS) transistor. The polysilicon transistor has high electron mobility, and thus, has fast driving characteristics.

The transistors T3 and T4 may be N-type transistors. The channels of the transistors T3 and T4 may include (e.g., may be made of) an oxide semiconductor. The oxide semiconductor transistor may be processed at a low temperature, and has low charge mobility when compared with polysilicon. Therefore, an amount of leakage current occurring in a turn-off state of the oxide semiconductor transistors is smaller than that of the polysilicon transistors.

In some embodiments, the seventh transistor T7 may be formed as an N-type oxide semiconductor transistor instead of the polysilicon transistor. In this case, one of the scan lines GWNLn and GILn may be connected to the gate electrode of the seventh transistor T7 instead of the scan line GBLn.

Figure 3:
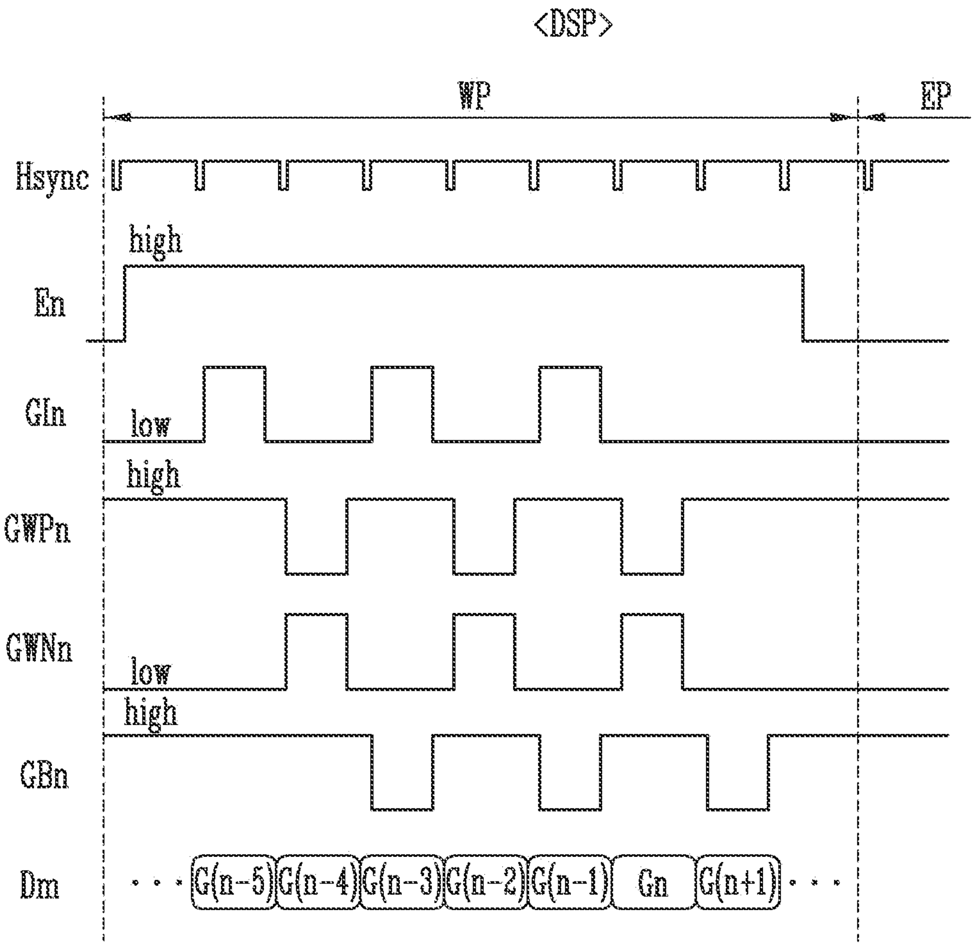
FIGS. 3-4 are drawings illustrating a display scan period according to an embodiment of the present disclosure.
Figure 4:
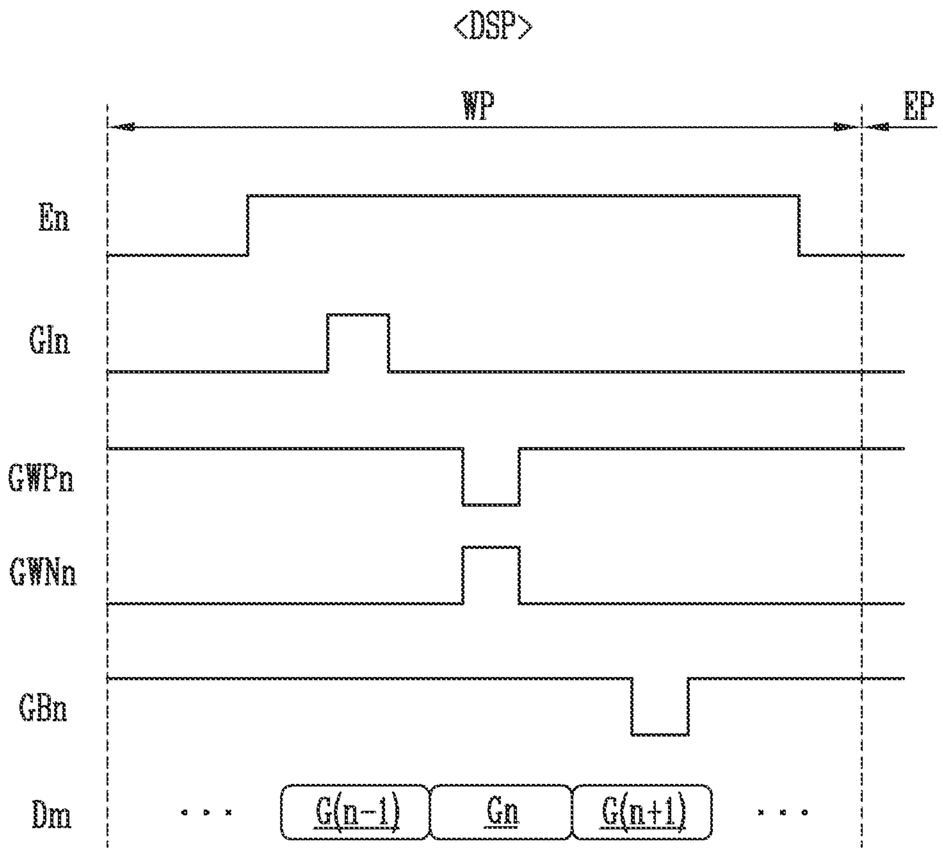

FIG. 3 and FIG. 4 are drawings illustrating a display scan period according to an embodiment of the present disclosure.

Referring to FIG. 1 to FIG. 3, the pixel PXnm may receive signals for displaying an image during a display scan period DSP. The display scan period DSP may include a period in which a data signal actually corresponding to a gray scale value Gn for an output image is written to the pixel PXnm.

The display scan period DSP may include a data writing period WP and a light emitting period EP. First, a light emitting signal En having a turn-off level (e.g., a high level) may be supplied to the light emitting line ELn during the data writing period WP. Accordingly, during the data writing period WP, the transistors T5 and T6 may be in a turned-off state.

Next, a first pulse having a turn-on level (e.g., a high level) is supplied to a scan line Gln. Accordingly, the fourth transistor T4 is turned on, and the gate electrode of the first transistor T1 and the initialization line VINTL are connected to each other. Accordingly, a voltage of the gate electrode of the first transistor T1 is initialized to an initialization voltage of the initialization line VINTL, and is maintained or substantially maintained by the storage capacitor Cst. For example, the initialization voltage of the initialization line VINTL may be sufficiently lower than the voltage of the first power line ELVDDL. For example, the initialization voltage may be a voltage having the same or substantially the same (or similar) level to that of the voltage of the second power line ELVSSL. Accordingly, the first transistor T1 may be turned on.

Next, the first pulses having the turn-on level are supplied to the scan lines GWPn and GWNn, so the corresponding transistors T2 and T3 are turned on. Accordingly, the data voltage Dm applied to the data line DLm is written to the storage capacitor Cst through the transistors T2, T1, and T3. However, in this case, the data voltage Dm may correspond to the grayscale value G(n−4) of the pixel before 4 horizontal periods, and thus, may be used for applying an on-bias voltage to the first transistor T1, and not for emitting light from the pixel PXnm. When the on-bias voltage is applied before the desired data voltage Dm is written into the first transistor T1, a hysteresis phenomenon may be improved.

Next, the first pulse having the turn-on level (e.g., a low level) is supplied to the scan line GBn, so the seventh transistor T7 is turned on. Accordingly, the anode voltage of the light emitting element LD is initialized.

In this case, the second pulse having the turn-on level (e.g., a high level) is supplied to the scan line GILn, and the above-described driving process is repeated (e.g., is performed again). In other words, the on-bias voltage is applied to the first transistor T1 once again, and the anode voltage of the light emitting element LD is initialized.

When the third pulse having the turn-on level is supplied to the scan lines GWPLn and GWNLn by repeating the above described process, the data voltage Dm corresponding to the grayscale value Gn of the pixel PXnm is written to the storage capacitor Cst. In this case, the data voltage Dm written to the storage capacitor Cst is a voltage in which a decrease in the threshold voltage of the first transistor T1 is reflected.

Finally, when the light emitting signal En has the turn-on level (e.g., a low level), the transistors T5 and T6 are turned on. Accordingly, a driving current path through a connection of the first power line ELVDDL, the transistors T5, T1, and T6, the light emitting element LD, and the second power line ELVSSL is formed, and a driving current flows therethrough. An amount of the driving current corresponds to the data voltage Dm stored in the storage capacitor Cst. In this case, because the driving current flows through the first transistor T1, a decrease in the threshold voltage of the first transistor T1 is reflected. Accordingly, because the decrease in a threshold voltage reflected in the data voltage Dm stored in the storage capacitor Cst and the decrease in the threshold voltage reflected in the driving current may cancel each other out, the driving current corresponding to the data voltage Dm may flow regardless of the threshold voltage value of the first transistor T1.

Depending on the amount of the driving current, the light emitting element LD emits light having a desired luminance.

In the present embodiment, each scan signal has been described as including three pulses, but the present disclosure is not limited thereto, and in another embodiment, each scan signal may include 2, 4, or more pulses. In another embodiment, each scan signal may be configured to include one pulse, and in this case, the process of applying the on-bias voltage to the first transistor T1 may be omitted (e.g., see FIG. 4).

In addition, an interval between pulses that are adjacent to each other in the horizontal synchronization signal Hsync may correspond to one horizontal period. Although the pulse of the horizontal synchronization signal Hsync is shown as a low level in FIG. 3, the present disclosure is not limited thereto, and the pulse of the horizontal synchronization signal Hsync may be a high level in another embodiment.

Figure 5:
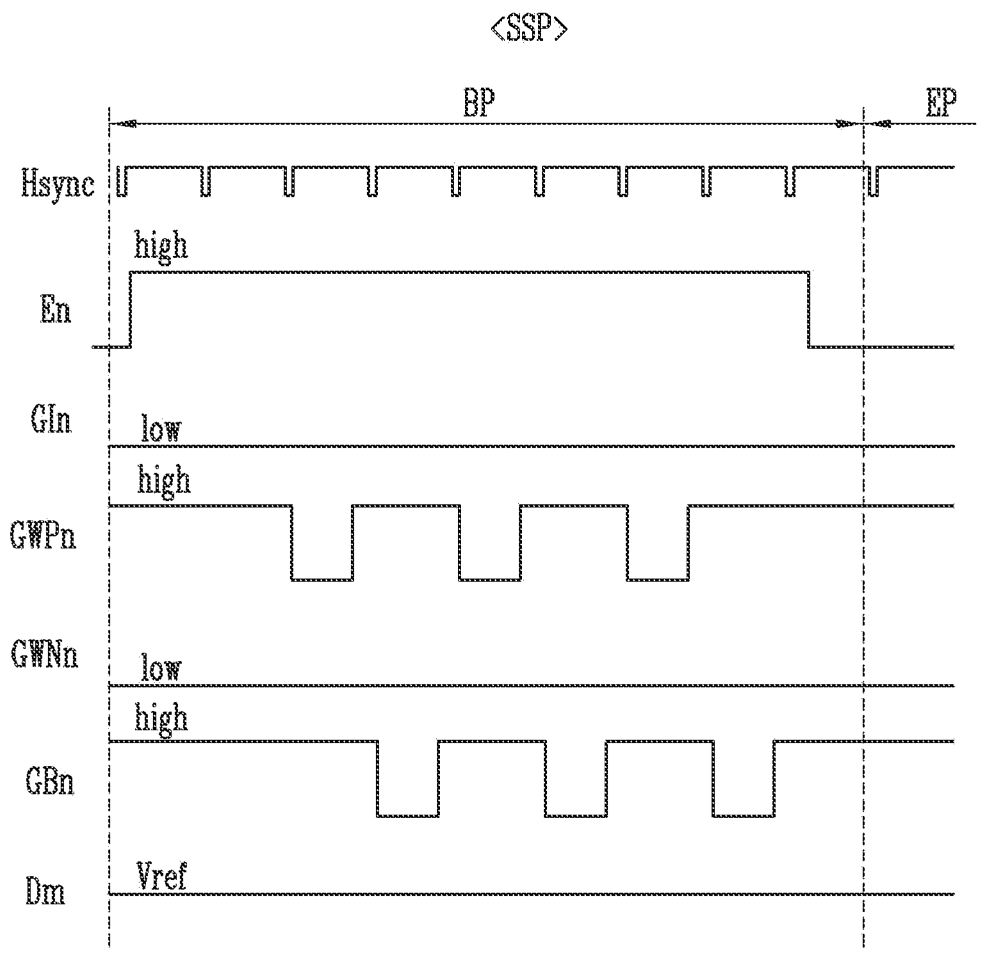
FIGS. 5-6 are drawings illustrating a self-scan period according to an embodiment of the present disclosure.
Figure 6:
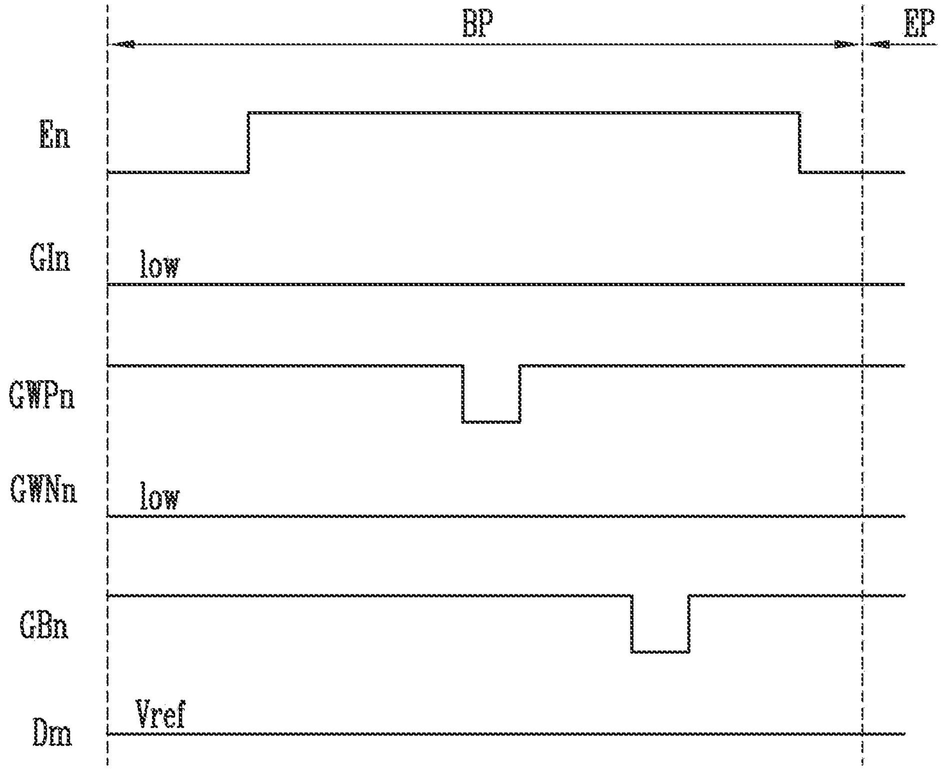

FIG. 5 and FIG. 6 are drawings illustrating a self-scan period according to an embodiment of the present disclosure. In this case, a self-scan period SSP may include a bias refresh period BP and the light emitting period EP.

Referring to FIG. 1, FIG. 2, and FIG. 5, the scan signals Gln and GWNn having the turn-off level (a low level) are supplied during the bias refresh period BP. Accordingly, the data voltage written to the storage capacitor Cst is not changed during the bias refresh period BP. In this case, a reference data voltage Vref may be applied to the data line DLm.

However, during the bias refresh period BP, the light emitting signal En and the scan signals GWPn and GBn having the same or substantially the same waveform as those in the data writing period WP may be supplied. Accordingly, by making the light output waveform of the light emitting element LD during the self-scan period SSP and the display scan period DSP similar to each other, a flicker may not be viewed by a user.

In the present embodiment, each of the scan signals GWPn and GBn has been described as including three pulses, but the present disclosure is not limited thereto, and in another embodiment, each of the scan signals GWPn and GBn may include 2, 4, or more pulses. In another embodiment, each of the scan signals GWPn and GBn may be configured to include one pulse, and in this case, the process of applying the on-bias voltage to the first transistor T1 may be omitted (e.g., see FIG. 6).

Figure 7:
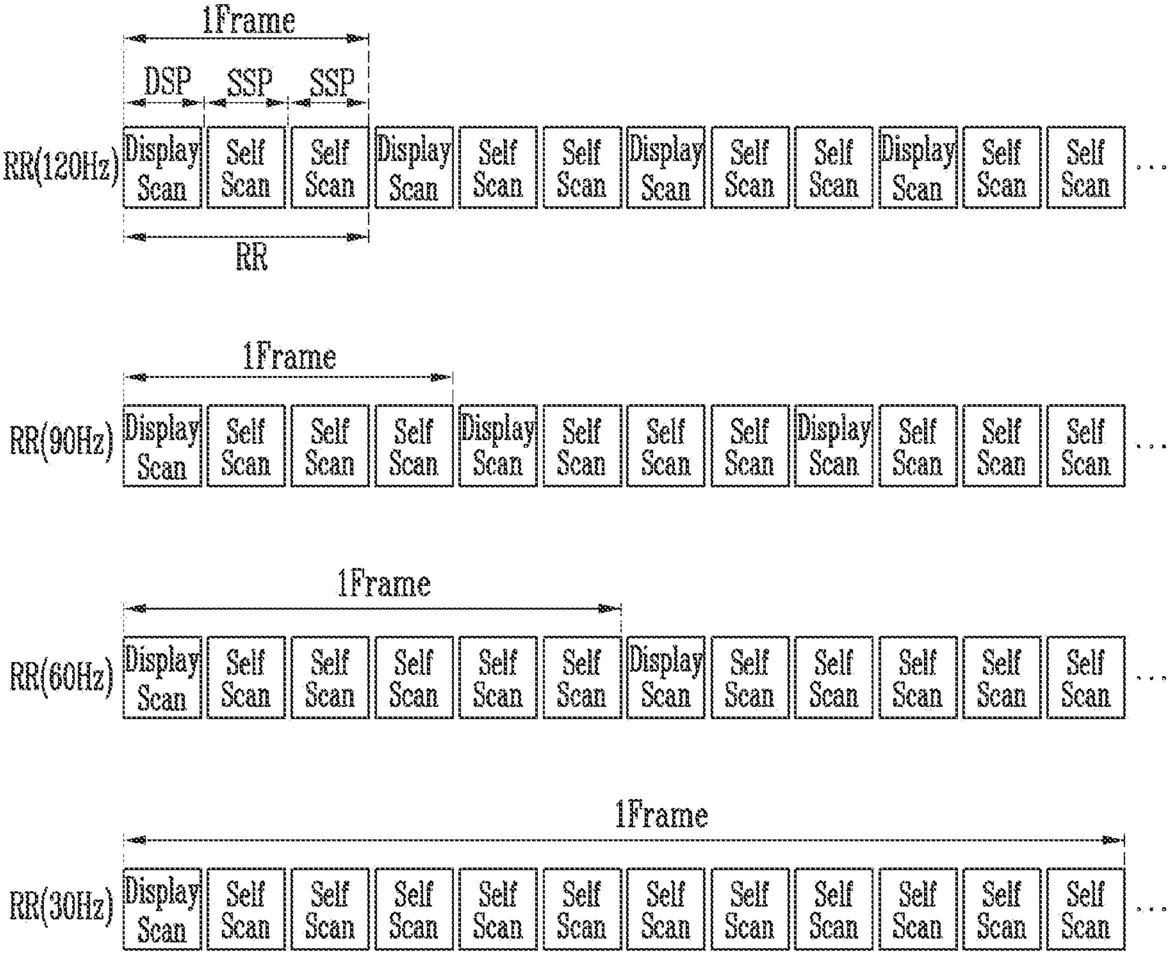
FIG. 7 is a schematic view illustrating an example of a driving method of a display device according to a driving frequency.

FIG. 7 is a schematic view illustrating an example of a driving method of a display device according to a driving frequency.

Referring to FIG. 1 to FIG. 7, the pixel PXnm may operate in the driving method shown in FIG. 3 or FIG. 4 during the display scan period DSP, and may operate in the driving method shown in FIG. 5 or FIG. 6 during the self-scan period SSP.

In an embodiment, an output frequency of the scan signals GIn and GWNn may vary according to a driving frequency RR. For example, the scan signals GIn and GWNn may be output at the same or substantially the same frequency as the driving frequency RR.

In an embodiment, lengths of the display scan period DSP and the self-scan period SSP may be the same or substantially the same as each other. However, a number of the self-scan periods SSP that are included in one frame period may be determined according to the driving frequency RR.

As shown in FIG. 7, when the display device 1000 is driven at the driving frequency RR of 120 Hz, one frame period may include one display scan period DSP and two self-scan periods SSP. Accordingly, when the display device 1000 is driven at the driving frequency RR of 120 Hz, during one frame period, each of the pixels PX may alternately emit light and not emit light, which may be repeated three times.

When the display device 1000 is driven at the driving frequency RR of 90 Hz, one frame period may include one display scan period DSP and three consecutive self-scan periods SSP. Accordingly, when the display device 1000 is driven at the driving frequency RR of 90 Hz, during one frame period, each of the pixels PX may alternately emit light and not emit light, which may be repeated 4 times.

Similarly, the display device 1000 may be driven at a driving frequency of 60 Hz, 30 Hz, and/or the like by adjusting the number of the self-scan periods SSP included in one frame period. As the driving frequency decreases, the number of the self-scan periods SSP increases, so that an on-bias of a suitable size (e.g., a certain or predetermined size) may be periodically applied to each of the first transistors T1 included in each of the pixels PX. Accordingly, luminance reduction, flicker, and image retention in low frequency driving may be improved.

Figure 8:
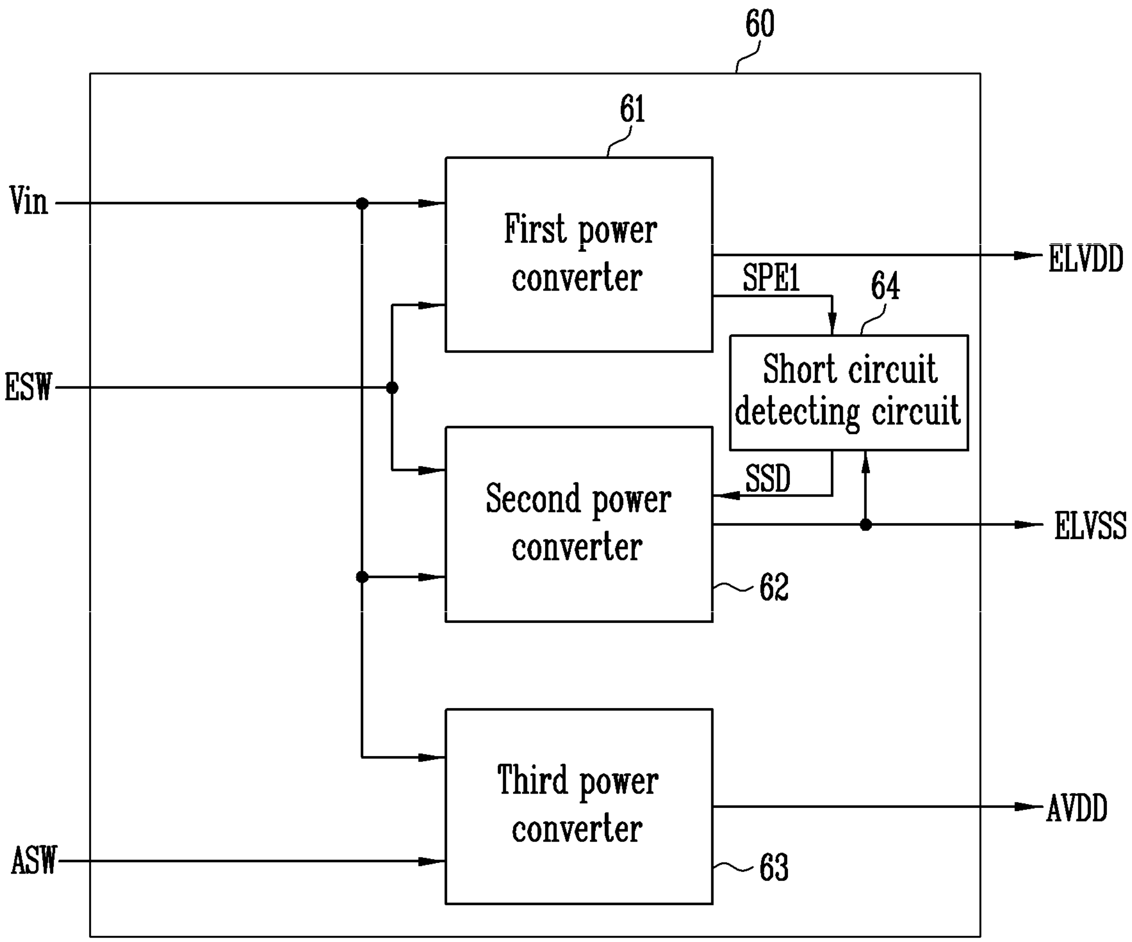
FIG. 8 is a drawing illustrating a power provider according to an embodiment of the present disclosure.

FIG. 8 is a drawing illustrating a power provider according to an embodiment of the present disclosure.

Referring to FIG. 8, the power provider 60 according to an embodiment of the present disclosure may include a first power converter 61, a second power converter 62, a third power converter 63, and a short circuit detecting circuit 64.

The first power converter 61 and the second power converter 62 may receive a first control signal ESW. The third power converter 63 may receive a second control signal ASW.

The short circuit detecting circuit 64 may stop operations of the first and second power converters 61 and 62 when a detecting voltage measured at a second output terminal of the second power converter 62 is greater than the reference short circuit voltage.

For example, when the first power converter 61 ends a pre-charge period of a soft start operation, the first power converter 61 may provide a first pre-charge end signal SPE1 having an enable level. In this case, referring to FIG. 14, the soft start operation (t3-t4') may include a pre-charge period (t3-t4) in which the first power voltage ELVDD becomes a level of the input voltage Vin, and a boosting period (t4-t4') in which the first power voltage ELVDD becomes a level of the target first power voltage ELVDD. When the short circuit detecting circuit 64 receives the first pre-charge end signal SPE1 having the enable level at a time point t4, after a suitable delay period (e.g., a predetermined delay period) Td has elapsed, the level of the second power voltage ELVSS (or detecting voltage) measured at the second output terminal may be compared with the level of the reference short circuit voltage Vref_SSD (e.g., see FIG. 12). In this case, the short circuit detecting circuit 64 may generate a sensing enable signal SEN that delays the first pre-charge end signal SPE1 by a suitable delay period (e.g., a preset delay period) Td through a delay part 64*c* (e.g., see FIG. 12). However, the present disclosure is not limited thereto. For example, the sensing enable signal SEN may be generated after being delayed by a suitable delay period (e.g., a predetermined delay period) Td from a finishing point t4' of the soft start operation.

When the level of the second power voltage ELVSS (or detecting voltage) is greater than the level of the reference short circuit voltage Vref_SSD, the short circuit detecting circuit 64 may provide a short circuit sensing signal SSD having a disable level. The short circuit sensing signal SSD having the disable level may indicate (e.g., may mean) that a failure state has occurred, in which the first power line ELVDDL and the second power line ELVSSL are short-circuited. When the second power converter 62 receives the short circuit sensing signal SSD having the disable level, the second power converter 62 may not convert the input voltage Vin into the second power voltage ELVSS.

The short circuit detecting circuit 64 may provide the short circuit sensing signal SSD having the enable level when the second power voltage ELVSS (or the detecting voltage) is smaller than the reference short circuit voltage Vref_SDD. The short circuit sensing signal SSD having the enable level may indicate (e.g., may mean) that a normal state is operating, in which the first power line ELVDDL and the second power line ELVSSL are not short-circuited. When the second power converter 62 receives the short circuit sensing signal SSD having the enable level, the second power converter 62 may convert the input voltage Vin into the second power voltage ELVSS.

Figure 9:
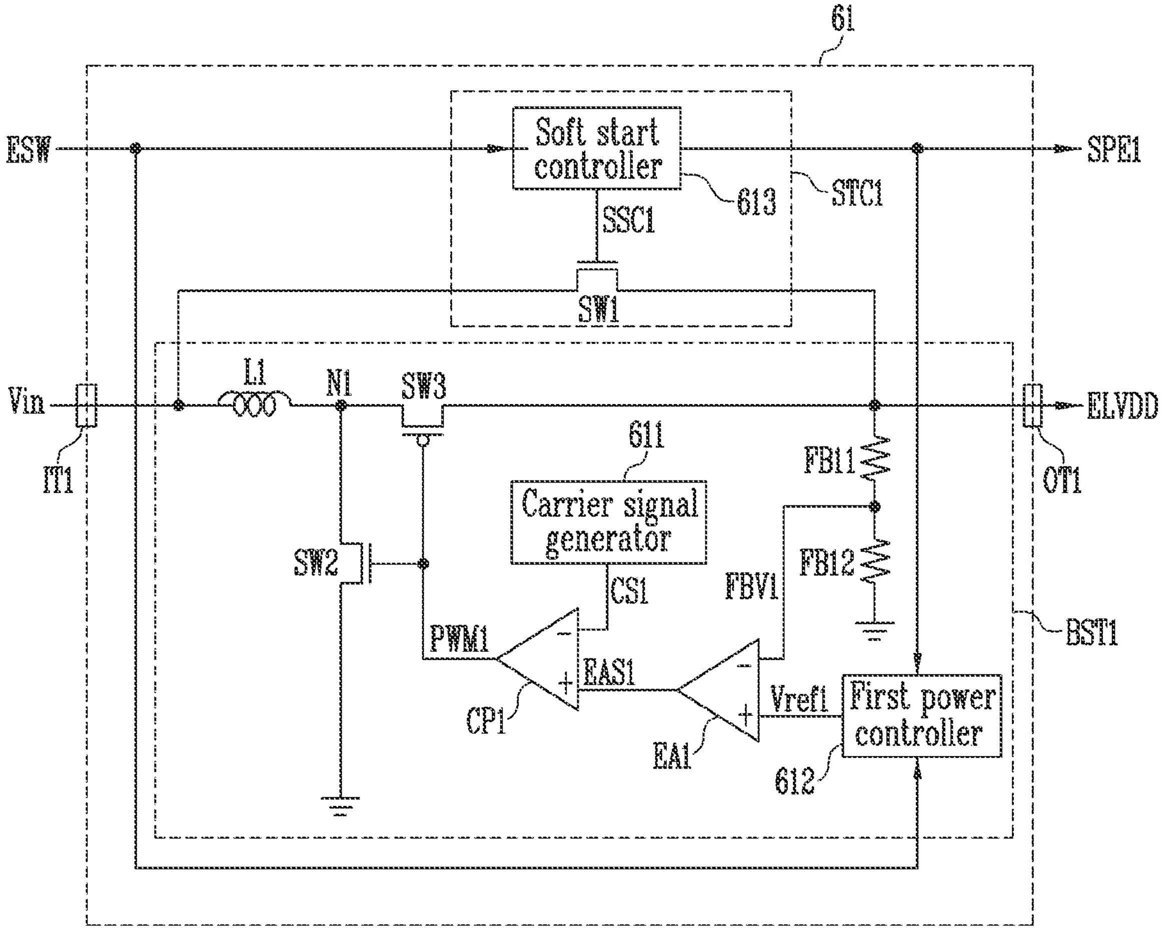
FIG. 9 is a drawing illustrating a first power converter according to an embodiment of the present disclosure.

FIG. 9 is a drawing illustrating a first power converter according to an embodiment of the present disclosure.

Referring to FIG. 9, the first power converter 61 according to an embodiment of the present disclosure may include a first soft start circuit STC1 and a first boost converter BST1.

The first power converter 61 may receive the input voltage Vin from a first input terminal IT1, and may provide the first power voltage ELVDD to a first output terminal OT1.

The first soft start circuit STC1 may include a soft start controller 613 and a first switch SW1. A first electrode of the first switch SW1 may be connected to the first input terminal IT1, and a second electrode of the first switch SW1 may be connected to the first output terminal OT1.

The soft start controller 613 may provide a control signal SSC1 to the first switch SW1 based on a first control signal ESW. For example, the soft start controller 613 may provide the control signal SSC1 having a turn-on level during the pre-charge period of the soft start operation, and the first switch SW1 may be turned on. When the pre-charge period of the soft start operation is completed, the soft start controller 613 may provide the control signal SSC1 having a turn-off level, and the first switch SW1 may be turned off.

In addition, when the pre-charge period of the soft start operation is completed, the soft start controller 613 may generate the first pre-charge end signal SPE1 having an enable level. When the pre-charge period of the soft start operation is not completed, the soft start controller 613 may generate the first pre-charge end signal SPE1 having a disable level.

The first boost converter BST1 may include a first inductor L1, a second switch SW2, and a third switch SW3. In addition, the first boost converter BST1 may include a carrier signal generator 611 for controlling the second switch SW2 and the third switch SW3, a first power controller 612, a first comparator CP1, a first error amplifier EA1, and first feedback resistors FB11 and FB12.

One end of the first inductor L1 may be connected to the first input terminal IT1, and the other end of the first inductor L1 may be connected to a first node N1. A first electrode of the second switch SW2 may be connected to the first node N1, and a second electrode of the second switch SW2 may be connected to ground. A first electrode of the third switch SW3 may be connected to the first node N1, and a second electrode of the third switch SW3 may be connected to the first output terminal OT1. Gate electrodes of the second and third switches SW2 and SW3 may be connected to an output of the first comparator CP1.

The first feedback resistors FB11 and FB12 may be connected in series between the first output terminal OT1 and ground. An inverting terminal of the first error amplifier EA1 may be connected to a node between the first feedback resistors FB11 and FB12 to receive a first feedback voltage FBV1. A non-inverting terminal of the first error amplifier EA1 may receive a first reference voltage Vref1 from the first power controller 612.

The first power controller 612 may determine the first reference voltage Vref1 based on the first control signal ESW and the first pre-charge end signal SPE1. The first error amplifier EA1 may increase a size of a first error signal EAS1 in a positive direction as the first reference voltage Vref1 is greater than the first feedback voltage FBV1. The first error amplifier EA1 may increase the size of the first error signal EAS1 in a negative direction as the first reference voltage Vref1 is smaller than the first feedback voltage FBV1. In another embodiment, the first error amplifier EA1 may provide the first error signal EAS1 having a minimum or reduced size when the first reference voltage Vref1 is smaller than the first feedback voltage FBV1.

The carrier signal generator 611 may provide a first carrier signal CS1. The first carrier signal CS1 may be a signal in which a triangular wave is periodically repeated. The carrier signal generator 611 may have a suitable configuration for pulse width modulation (PWM) driving as would be understood by those having ordinary skill in the art.

An inverting terminal of the first comparator CP1 may receive the first carrier signal CS1, and a non-inverting terminal of the first comparator CP1 may receive the first error signal EAS1. The first comparator CP1 may output a pulse when the first error signal EAS1 is greater than the first carrier signal CS1, and may not output a pulse when the first error signal EAS1 is smaller than the first carrier signal CS1. The output signal of the first comparator CP1 may be referred to as a first PWM signal PWM1, and a width of the pulse with respect to a period of the pulse may be referred to as a duty ratio. In other words, as the width of the pulse increases, the duty ratio may increase.

In response to the pulse of the first PWM signal PWM1, the second switch SW2 may be turned on, and the third switch SW3 may be turned off. In other words, as the pulse width (e.g., an ON-duty period) increases, the period during which the second switch SW2 is turned on may increase. In this case, a current flows from the input voltage Vin to ground through the first inductor L1, and energy may be stored in the first inductor L1.

On the other hand, during an OFF-duty period in which no pulse is generated, the second switch SW2 may be turned off, and the third switch SW3 may be turned on. In this case, the target first power voltage ELVDD greater than the input voltage Vin is applied to the first output terminal OT1 by adding the input voltage Vin and the current output from the first inductor L1. As the duty ratio increases, the target first power voltage ELVDD may be more significantly boosted.

Figure 10:
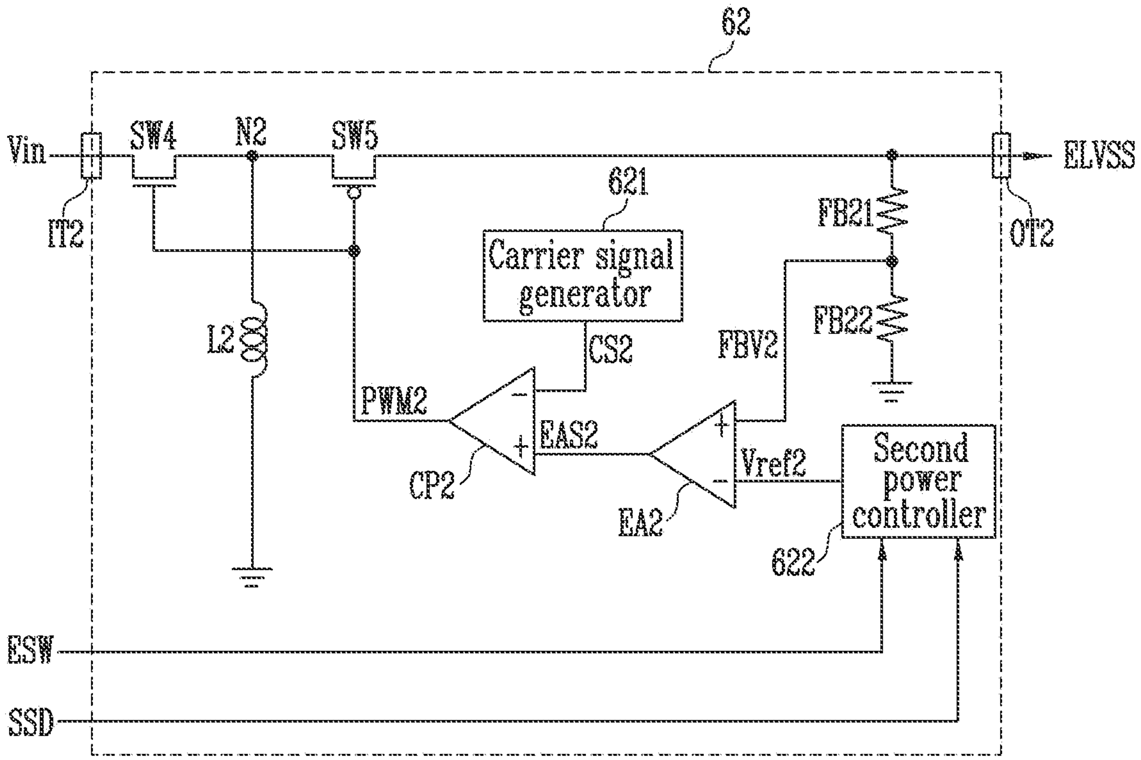
FIG. 10 is a drawing illustrating a second power converter according to an embodiment of the present disclosure.

FIG. 10 is a drawing illustrating a second power converter according to an embodiment of the present disclosure.

The second power converter 62 may receive the input voltage Vin from a second input terminal IT2, and may provide the second power voltage ELVSS to a second output terminal OT2. For example, the second power converter 62 may be an inverting buck-boost converter.

The second power converter 62 may include a second inductor L2, a fourth switch SW4, and a fifth switch SW5. In addition, the second power converter 62 may include a carrier signal generator 621 for controlling the fourth switch SW4 and the fifth switch SW5, a second power controller 622, a second comparator CP2, a second error amplifier EA2, and second feedback resistors FB21 and FB22.

A first electrode of the fourth switch SW4 may be connected to the second input terminal IT2, and a second electrode of the fourth switch SW4 may be connected to a second node N2. One end of the second inductor L2 may be connected to the second node N2, and the other end of the second inductor L2 may be connected to ground. A first electrode of the fifth switch SW5 may be connected to the second node N2, and a second electrode of the fifth switch SW5 may be connected to the second output terminal OT2. Gate electrodes of the fourth and fifth switches SW4 and SW5 may be connected to an output of the second comparator CP2.

The second feedback resistors FB21 and FB22 may be coupled in series between the second output terminal OT2 and ground. A non-inverting terminal of the second error amplifier EA2 may be connected to a node between the second feedback resistors FB21 and FB22 to receive a second feedback voltage FBV2. An inverting terminal of the second error amplifier EA2 may receive a second reference voltage Vref2 from the second power controller 622.

The second power controller 622 may determine the second reference voltage Vref2 based on the first control signal ESW and the short circuit sensing signal SSD. The second error amplifier EA2 may increase a size of a second error signal EAS2 in a positive direction as the second reference voltage Vref2 is smaller than the second feedback voltage FBV2. The second error amplifier EA2 may increase the size of the second error signal EAS2 in a negative direction as the second reference voltage Vref2 is greater than the second feedback voltage FBV2. In another embodiment, the second error amplifier EA2 may provide the second error signal EAS2 having a minimum or reduced size when the second reference voltage Vref2 is greater than the second feedback voltage FBV2.

The carrier signal generator 621 may provide a second carrier signal CS2. The second carrier signal CS2 may be a signal in which a triangular wave is periodically repeated. The carrier signal generator 621 may have a suitable configuration for PWM driving as would be understood by those having ordinary skill in the art.

An inverting terminal of the second comparator CP2 may receive the second carrier signal CS2, and a non-inverting terminal of the second comparator CP2 may receive the second error signal EAS2. The second comparator CP2 may output a pulse when the second error signal EAS2 is greater than the second carrier signal CS2, and may not output a pulse when the second error signal EAS2 is smaller than the second carrier signal CS2. The output signal of the second comparator CP2 may be referred to as a second PWM signal PWM2, and a width of the pulse with respect to a period of the pulse may be referred to as a duty ratio. In other words, as the width of the pulse increases, the duty ratio may increase.

In response to the pulse of the second PWM signal PWM2, the fourth switch SW4 may be turned on, and the fifth switch SW5 may be turned off. In other words, as the pulse width (e.g., an ON-duty period) increases, the period during which the fourth switch SW4 is turned on may increase. In this case, a current flows from the input voltage Vin to ground through the second inductor L2, and energy may be stored in the second inductor L2.

On the other hand, during an OFF-duty period in which no pulse is generated, the fourth switch SW4 may be turned off, and the fifth switch SW5 may be turned on. In this case, because the second inductor L2 maintains or substantially maintains the current flowing to ground, the second power voltage ELVSS of the second output terminal OT2 becomes smaller than the input voltage Vin. As the duty ratio increases, the second power voltage ELVSS may further decrease.

Figure 11:
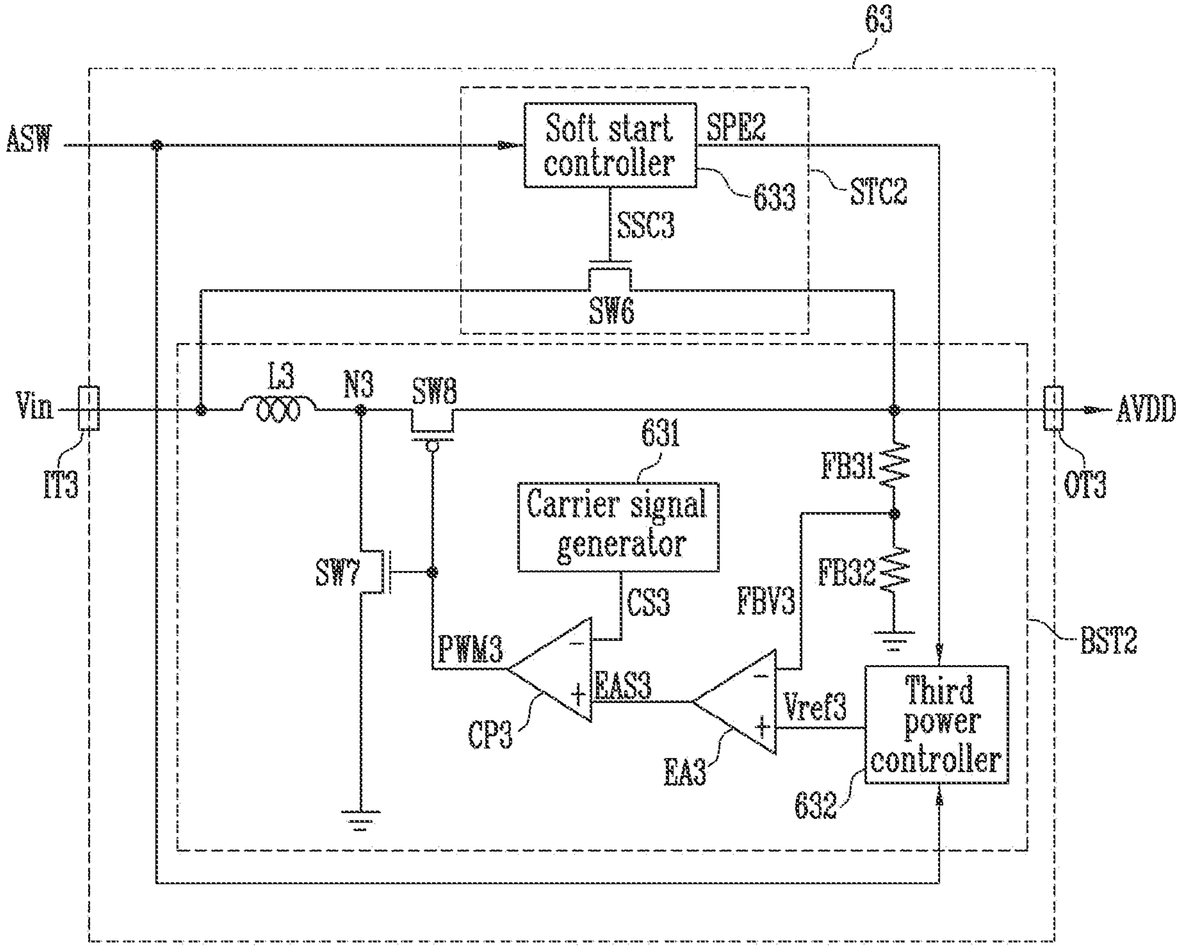
FIG. 11 is a drawing illustrating a third power converter according to an embodiment of the present disclosure.

FIG. 11 is a drawing illustrating a third power converter according to an embodiment of the present disclosure.

Referring to FIG. 11, the third power converter 63 according to an embodiment of the present disclosure may include a second soft start circuit STC2 and a second boost converter BST2.

The third power converter 63 may receive the input voltage Vin from a third input terminal IT3, and may provide the third power voltage AVDD to a third output terminal OT3.

The second soft start circuit STC2 may include a soft start controller 633 and a sixth switch SW6. A first electrode of the sixth switch SW6 may be connected to the third input terminal IT3, and a second electrode of the sixth switch SW6 may be connected to the third output terminal OT3.

The soft start controller 633 may provide a control signal SSC3 to the sixth switch SW6 based on a second control signal ASW. For example, the soft start controller 633 may provide the control signal SSC3 having a turn-on level during the pre-charge period of the soft start operation, and the sixth switch SW6 may be turned on. When the pre-charge period of the soft start operation is completed, the soft start controller 633 may provide the control signal SSC3 having a turn-off level, and the sixth switch SW6 may be turned off.

In addition, when the pre-charge period of the soft start operation is completed, the soft start controller 633 may generate a second pre-charge end signal SPE2 having an enable level. When the pre-charge period of the soft start operation is not completed, the soft start controller 633 may generate the second pre-charge end signal SPE2 having a disable level.

The second boost converter BST2 may include a third inductor L3, a seventh switch SW7, and an eighth switch SW8. In addition, the second boost converter BST2 may include a carrier signal generator 631 for controlling the seventh switch SW7 and the eighth switch SW8, a third power controller 632, a third comparator CP3, a third error amplifier EA3, and third feedback resistors FB31 and FB32.

One end of the third inductor L3 may be connected to the third input terminal IT3, and the other end of the third inductor L3 may be connected to a third node N3. A first electrode of the seventh switch SW7 may be connected to the third node N3, and a second electrode of the seventh switch SW7 may be connected to ground. A first electrode of the eighth switch SW8 may be connected to the third node N3, and a second electrode of the eighth switch SW8 may be connected to the third output terminal OT3. Gate electrodes of the seventh and eight switches SW7 and SW8 may be connected to an output of the third comparator CP3.

The third feedback resistors FB31 and FB32 may be connected in series between the third output terminal OT3 and ground. An inverting terminal of the third error amplifier EA3 may be connected to a node between the third feedback resistors FB31 and FB32 to receive a third feedback voltage FBV3. A non-inverting terminal of the third error amplifier EA3 may receive a third reference voltage Vref3 from the third power controller 632.

The third power controller 632 may determine the first reference voltage Vref3 based on the second control signal ASW and the second pre-charge end signal SPE2. The third error amplifier EA3 may increase a size of a third error signal EAS3 in a positive direction as the third reference voltage Vref3 is greater than the third feedback voltage FBV3. The third error amplifier EA3 may increase the size of the third error signal EAS3 in a negative direction as the third reference voltage Vref3 is smaller than the third feedback voltage FBV3. In another embodiment, the third error amplifier EA3 may provide the third error signal EAS3 having a minimum or reduced size when the third reference voltage Vref3 is smaller than the third feedback voltage FBV3.

The carrier signal generator 631 may provide a third carrier signal CS3. The third carrier signal CS3 may be a signal in which a triangular wave is periodically repeated. The carrier signal generator 631 may have a suitable configuration for PWM driving as would be understood by those having ordinary skill in the art.

An inverting terminal of the third comparator CP3 may receive the third carrier signal CS3, and a non-inverting terminal of the third comparator CP3 may receive the third error signal EAS3. The third comparator CP3 may output a pulse when the third error signal EAS3 is greater than the third carrier signal CS3, and may not output a pulse when the third error signal EAS3 is smaller than the third carrier signal CS3. The output signal of the third comparator CP3 may be referred to as a third PWM signal PWM3, and a width of the pulse with respect to a period of the pulse may be referred to as a duty ratio. In other words, as the width of the pulse increases, the duty ratio may increase.

In response to the pulse of the third PWM signal PWM3, the seventh switch SW7 may be turned on, and the eighth switch SW8 may be turned off. In other words, as the pulse width (e.g., an ON-duty period) increases, the period during which the seventh switch SW7 is turned on may increase. In this case, a current flows from the input voltage Vin to ground through the third inductor L3, and energy may be stored in the third inductor L3.

On the other hand, during an OFF-duty period in which no pulse is generated, the seventh switch SW7 may be turned off, and the eighth switch SW8 may be turned on. In this case, the target third power voltage AVDD greater than the input voltage Vin is applied to the third output terminal OT3 by adding the input voltage Vin and the current output from the third inductor L3. As the duty ratio increases, the target third power voltage AVDD may be more significantly boosted.

Figure 12:
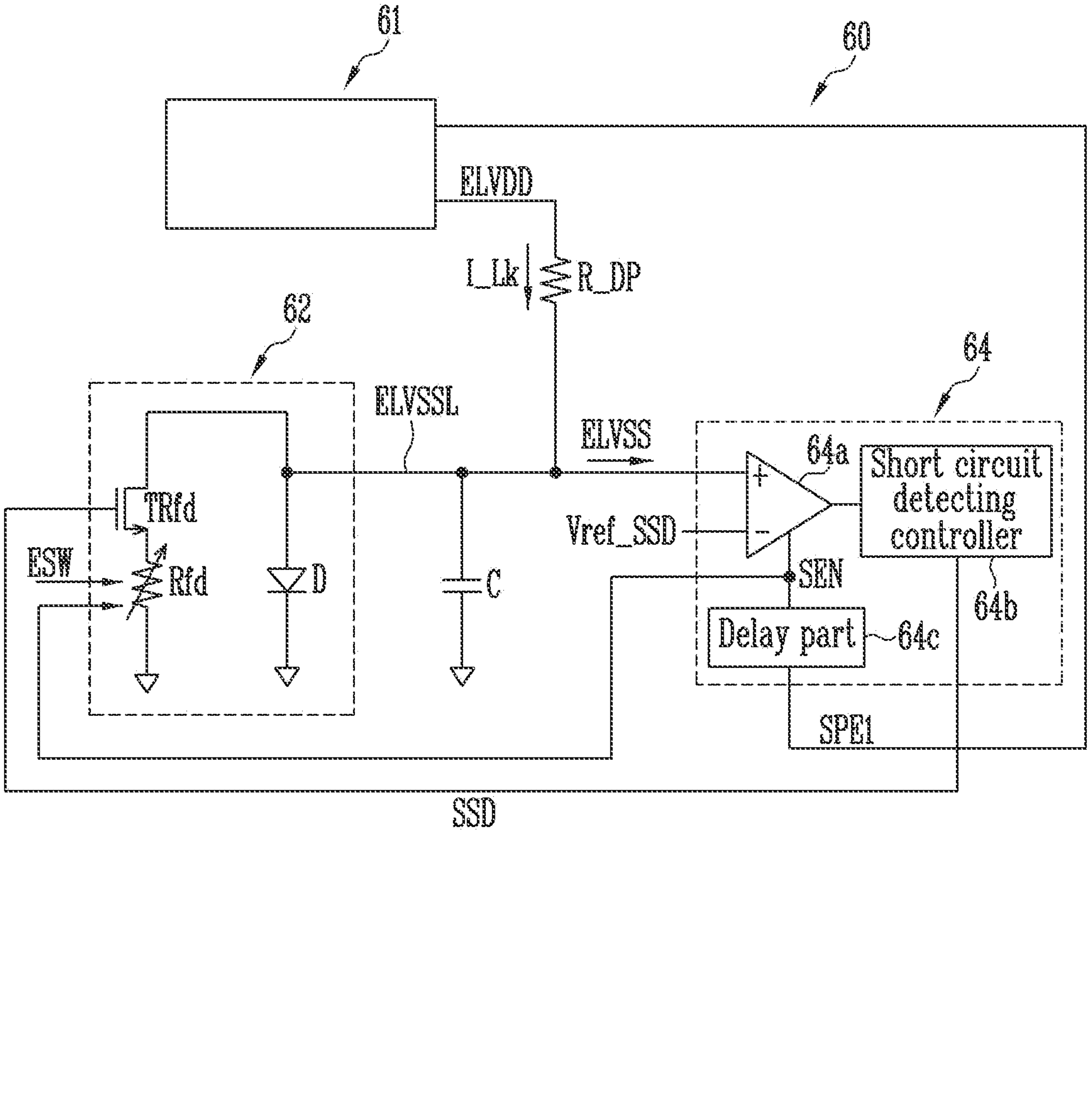
FIG. 12 is a drawing illustrating a short circuit detecting circuit of FIG. 8.
Figure 13A:
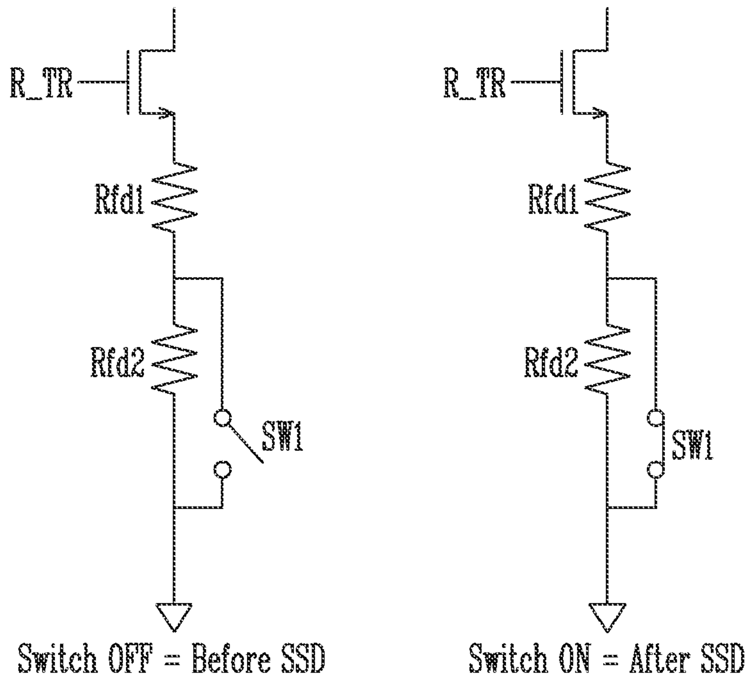
FIGS. 13A-13B are drawings illustrating examples of a variable resistance included in a second power converter of FIG. 12.
Figure 13B:
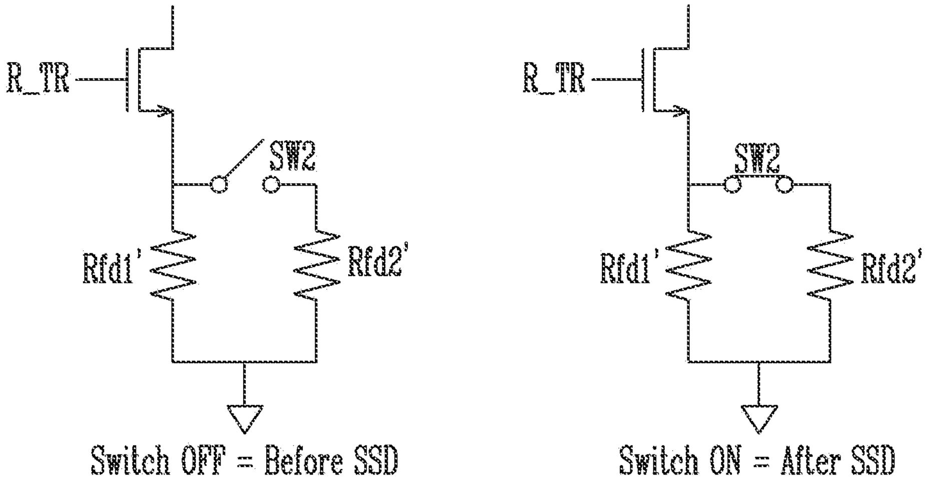

FIG. 12 is a drawing illustrating a short circuit detecting circuit of FIG. 8. FIG. 13A and FIG. 13B are drawings illustrating examples of a variable resistance included in a second power converter of FIG. 12.

Referring to FIG. 1, FIG. 2, FIG. 8, FIG. 10, and FIG. 12, the power provider 60 may include the first power converter 61, the second power converter 62, and the short circuit detecting circuit 64. In this case, the first power converter 61 may have the same or substantially the same configuration as that of the first power converter 61 described above with reference to FIG. 8 and FIG. 9, and thus, redundant description thereof may not be repeated, and the second power converter 62 and the short circuit detecting circuit 64 will be mainly described in more detail below.

The second power converter 62 may include a control transistor TRfd, a variable resistance Rfd, and a diode D.

The short circuit detecting circuit 64 may include a comparator 64*a*, a short circuit detecting controller 64*b*, and a delay part 64*c*.

The comparator 64*a* may be connected to the second power line ELVSSL. The level of the second power voltage ELVSS (or a sensed voltage) measured from the second power line ELVSSL is compared with the level of the reference short circuit voltage Vref_SSD, and a logic signal according to the comparison result is transmitted to the short circuit detecting controller 64*b*. For example, when the level of the second power voltage ELVSS (or the sensed voltage) is greater than the level of the reference short circuit voltage Vref_SSD, a logic high level signal may be output, and when the level of the second power voltage ELVSS (or the sensed voltage) is smaller than the level of the reference short circuit voltage Vref_SSD, a logic low level signal may be output. In this case, as described in more detail below, the reference short circuit voltage Vref_SDD may vary according to the driving frequency of the display device 1000.

The short circuit detecting controller 64*b* may detect an abnormal state of the display panel 50 based on a signal output from the comparator 64*a*. The short circuit detecting controller 64*b* may feed a signal having a logic level corresponding to the detected result back to the control transistor TRfd. For example, when a signal having a logic high level is received from the comparator 64*a*, the short circuit detecting controller 64*b* may output a signal having a turn-on level of the control transistor TRfd, and when a signal having a logic low level is received from the comparator 64*a*, the short circuit detecting controller 64*b* may output a signal having a turn-off level of the control transistor TRfd.

According to an embodiment of the present disclosure, the comparator 64*a* may be activated or deactivated based on the sensing enable signal SEN provided from the delay part 64*c*. The delay part 64*c* may delay the first pre-charge end signal SPE1 received from the first power converter 61 by the delay period (e.g., the predetermined delay period) Td to generate the sensing enable signal SEN. As described above, the sensing enable signal SEN may be generated after being delayed by the delay period Td from the finishing point t4' (e.g., see FIG. 14) of the soft start operation.

Although the comparator 64*a* and the short circuit detecting controller 64*b* are shown as separate units (e.g., separate elements) in FIG. 12, the present disclosure is not limited thereto, and in another embodiment, the comparator 64*a* and the short circuit detecting controller 64*b* may be configured as one unit (e.g., as one element or component), or the short circuit detecting controller 64*b* may be omitted as needed or desired. In the present embodiment, as described in more detail below, a gate electrode of the control transistor TRfd is connected to an output terminal of the comparator 64*a*, and the control transistor TRfd may be turned on or turned off according to a signal output from the comparator 64*a*.

The control transistor TRfd may be connected between the variable resistance Rfd and the diode D, and the gate electrode of the control transistor TRfd may be connected to the short circuit detecting controller 64*b*. The control transistor TRfd may be turned on or turned off in response to a signal output from the short circuit detecting controller 64*b*. For example, when the level of the second power voltage ELVSS (or the sensed voltage) measured at the second power line ELVSSL of the display panel 50 is greater than the level of the reference short circuit voltage Vref_SSD, the control transistor TRfd may be turned on by receiving a turn-on level signal from the short circuit detecting controller 64*b*. When the control transistor TRfd is turned on, the variable resistance Rfd and the diode D may be electrically connected to each other.

The variable resistance Rfd may be connected between the control transistor TRfd and ground. A resistance value of the variable resistance Rfd may be determined as a value for supplying a low level voltage, for example, such as a ground level voltage, to the second power line ELVSSL of the display panel 50.

The resistance value of the variable resistance Rfd may be controlled by the first control signal ESW and the sensing enable signal SEN. For example, the resistance value of the variable resistance Rfd may be a first resistance value during a short circuit detecting period TSSD (e.g., see FIG. 15) from a time point at which the first control signal ESW is turned on until the short circuit sensing signal SSD is turned on. On the other hand, the resistance value of the variable resistance Rfd, when the power provider 60 normally operates and then is powered off, may have a second resistance value during a discharge period TFD (e.g., see FIG. 15) in which the voltage ELVSS of the second power line ELVSSL is discharged to ground. Accordingly, a length of the discharge period TFD may be maintained or substantially maintained to be constant or substantially constant regardless of a size of a capacitor (e.g., C in FIG. 12).

During the discharge period TFD, a leakage current I_Lk may be calculated by dividing the first power voltage ELVDD by a sum of the short circuit resistance R_DP of the display panel 50, the resistance R_TR of the control transistor TRfd, and the variable resistance Rfd.

Referring to FIG. 13A, the variable resistance Rfd may have a structure in which a first resistance Rfd1 and a second resistance Rfd2 are connected in series, and a first switch SW1 is connected in parallel to both ends (e.g., to opposite ends) of the second resistance Rfd2. When the first switch SW1 is turned off, an equivalent resistance value obtained by adding the resistance R_TR of the control transistor TRfd and the variable resistance Rfd may be defined as the first resistance value, and when the first switch SW1 is turned on, an equivalent resistance value obtained by adding the resistance R_TR of the control transistor TRfd and the variable resistance Rfd may be defined as the second resistance value. For example, when the equivalent resistance value obtained by adding the resistance R_TR of the control transistor TRfd and the first resistance Rfd1 is 50Ω, and the second resistance Rfd2 is 50Ω, the first resistance value may be 100Ω (e.g., R_TR+Rfd1+Rfd2), and the second resistance value may be 50Ω (e.g., R_TR+Rfd1). In this case, the first switch SW1 may be in a turn-off state during the short detecting period TSSD, and the first switch SW1 may be in a turn-on state during the discharge period TFD.

Referring to FIG. 13B, the variable resistance Rfd may have a structure in which a (1_1)-th resistance Rfd1' and a (2_1)-th resistance Rfd2' are connected in parallel, a second switch SW2 is connected between one end of the (1_1)-th resistance Rfd1' and one end of the (2_1)-th resistance Rfd2, and the other end of the (1_1)-th resistance Rfd1' and the other end of the (2_1)-th resistance Rfd2 are connected to ground. When the second switch SW2 is turned off, an equivalent resistance value obtained by adding the resistance R_TR of the control transistor TRfd and the variable resistance Rfd may be defined as the first resistance value, and when the second switch SW2 is turned on, an equivalent resistance value obtained by adding the resistance R_TR of the control transistor TRfd and the variable resistance Rfd may be defined as the second resistance value. For example, when the resistance R_TR of the control transistor TRfd is 25Ω, and the first resistance Rfd1 and the second resistance Rfd2 are 50Ω, the first resistance value may be 75Ω, and the second resistance value may be 50Ω. In this case, the second switch SW2 may be in a turn-off state during the short detecting period TSSD, and the second switch SW2 may be in a turn-on state during the discharge period TFD.

The diode D is a voltage output unit (e.g., a voltage output device), and may be configured as a Zener diode. When the control transistor TRfd is turned on, the diode D may be electrically connected to the variable resistance Rfd to supply a constant or substantially constant voltage (e.g., a predetermined constant voltage) to the second power line ELVSSL of the display panel 50. For example, the constant or substantially constant voltage may be a ground level voltage.

In addition, the power provider 60 may further include the capacitor C connected between the second power line ELVSSL and ground. The capacitor C may be disposed to remove an AC noise or ripple caused by an output voltage variation of the second power converter 62.

Figure 14:
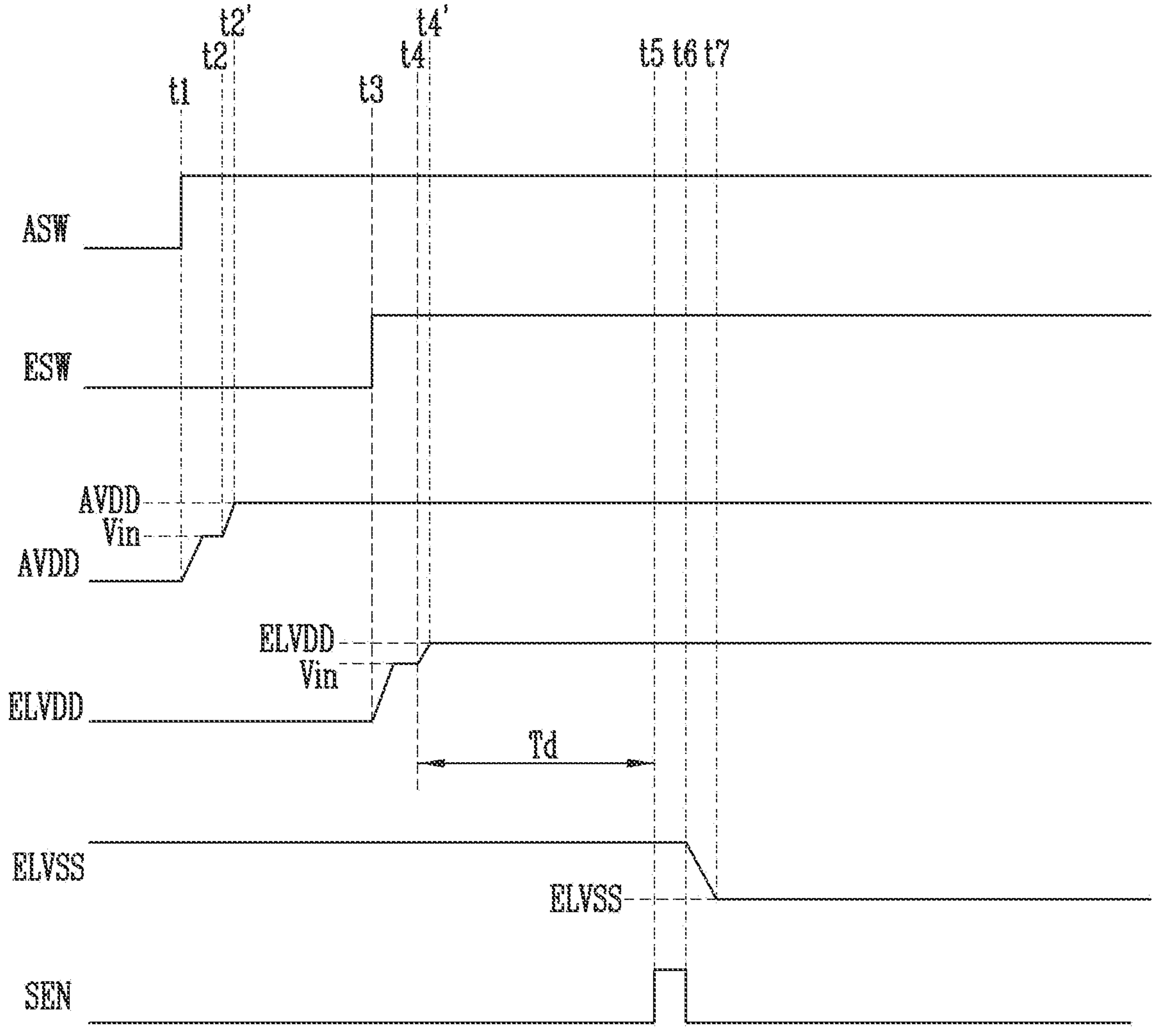
FIG. 14 is a drawing illustrating a driving method of a power provider when a short circuit does not occur in a display panel.

FIG. 14 is a drawing illustrating a driving method of a power provider when a short circuit does not occur in a display panel.

Referring to FIG. 1, FIGS. 9 to 12, and FIG. 14, before the time point t1, the display device 1000 may be in a power-off state. In this case, the first control signal ESW and the second control signal ASW may be at the disable level (e.g., a logic low level).

At the time point t1, the display device 1000 may be powered-on. The second control signal ASW may be switched from the disable level to the enable level (e.g., a logic high level). In this case, the second soft start circuit STC2 of the third power converter 63 may connect the third input terminal IT3 to the third output terminal OT3 during the third period (t1-t2) (e.g., a pre-charge period). In other words, the sixth switch SW6 may be turned on during the third period (t1-t2). Therefore, the third output terminal OT3 may be charged with the input voltage Vin. At the time point t2 at which the pre-charge period of the soft start operation is completed, the sixth switch SW6 may be turned off. When the pre-charge period of the soft start operation is completed, the soft start controller 633 may generate the second pre-charge end signal SPE2 having the enable level. In this case, the second soft start operation (t1-t2') may include the pre-charge period (t1-t2) in which the third power voltage AVDD becomes the level of the input voltage Vin, and the boosting period (t2-t2') in which the level of the input voltage Vin becomes the level of the target third power voltage AVDD.

At the time point t2, the second boost converter BST2 of the third power converter 63, which receives the second pre-charge end signal SPE2 of the enable level, may convert the input voltage Vin during the boost period from the time point t2 to the point time t2' to provide the target third power voltage AVDD that is greater than the input voltage Vin to the third output terminal OT3.

At the time point t3, the first control signal ESW may be switched from the disable level to the enable level. In this case, the first soft start circuit STC1 of the first power converter 61 may connect the first input terminal IT1 to the first output terminal OT1 during the first period (t3-t4) (e.g., a pre-charge period). In other words, the first switch SW1 may be turned on during the first period (t3-t4). Accordingly, the first output terminal OT1 may be charged with the input voltage Vin. At the time point t4 at which the pre-charge period of the soft start operation is completed, the first switch SW1 may be turned off.

The first boost converter BST1 of the first power converter 61 may convert the input voltage Vin during the boost period from the time point t4 to the time point t4' to provide the target first power voltage ELVDD that is greater than the input voltage Vin to the first output terminal OT1. In other words, the first soft start operation (t3-t4') may include the pre-charge period (t3-t4) in which the first power voltage ELVDD becomes the level of the input voltage Vin, and the boosting period (t4-t4') in which the level of the input voltage Vin becomes the level of the target first power voltage ELVDD.

When the pre-charge period of the soft start operation is completed at the time point t4, the soft start controller 613 of the first power converter 61 may generate the first pre-charge end signal SPE1 having an enable level. For example, at the time point t4, the delay part 64*c* may receive the first pre-charge end signal SPE1 having the enable level from the soft start controller 613. The delay part 64*c* may generate the sensing enable signal SEN at the time point t5 by delaying the delay period Td from the time point t4 at which the first pre-charge end signal SPE1 is received. However, the present disclosure is not limited thereto, for example, the sensing enable signal SEN may be generated after being delayed by the delay period Td from the finishing point t4' of the soft start operation.

At the time point t5, the short circuit detecting circuit 64 may sense whether the second power line ELVSSL is shorted. At the time point t5, the short circuit detecting circuit 64 may stop the operations of the first and second power converters 61 and 62 when the level of the sensed voltage ELVSS measured at the second power line ELVSSL is greater than the level of the reference short circuit voltage Vref_SSD. FIG. 14 shows that the second power line ELVSSL is in a normal state, and thus, is not short-circuited.

During the second period (t6-t7), the second power converter 62 may convert the input voltage Vin received from the second input terminal IT2 to provide the second power voltage ELVSS that is smaller than the input voltage Vin to the second output terminal OT2.

Accordingly, the time point t7 may be a time point at which the conversion of the first power voltage ELVDD, the second power voltage ELVSS, and the third power voltage AVDD to the target levels are completed. The display device 1000 may display an image by using the pixels PX from the time point t7. The first power voltage ELVDD may be greater than the second power voltage ELVSS. In addition, the third power voltage AVDD may be greater than the first power voltage ELVDD.

Figure 15:
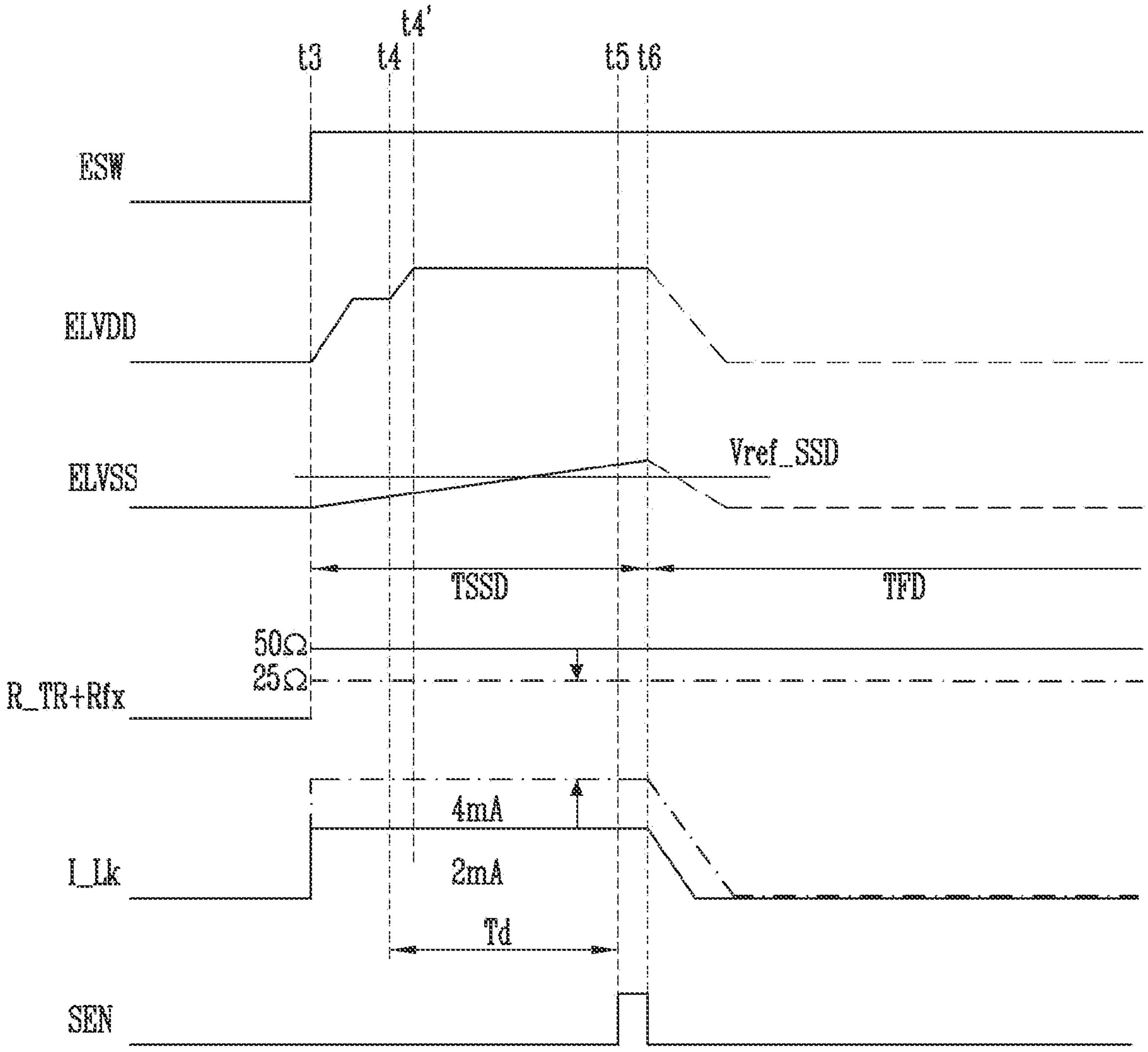
FIG. 15 is a drawing illustrating a driving method of a power provider when a short circuit occurs in a display panel.
Figure 16:
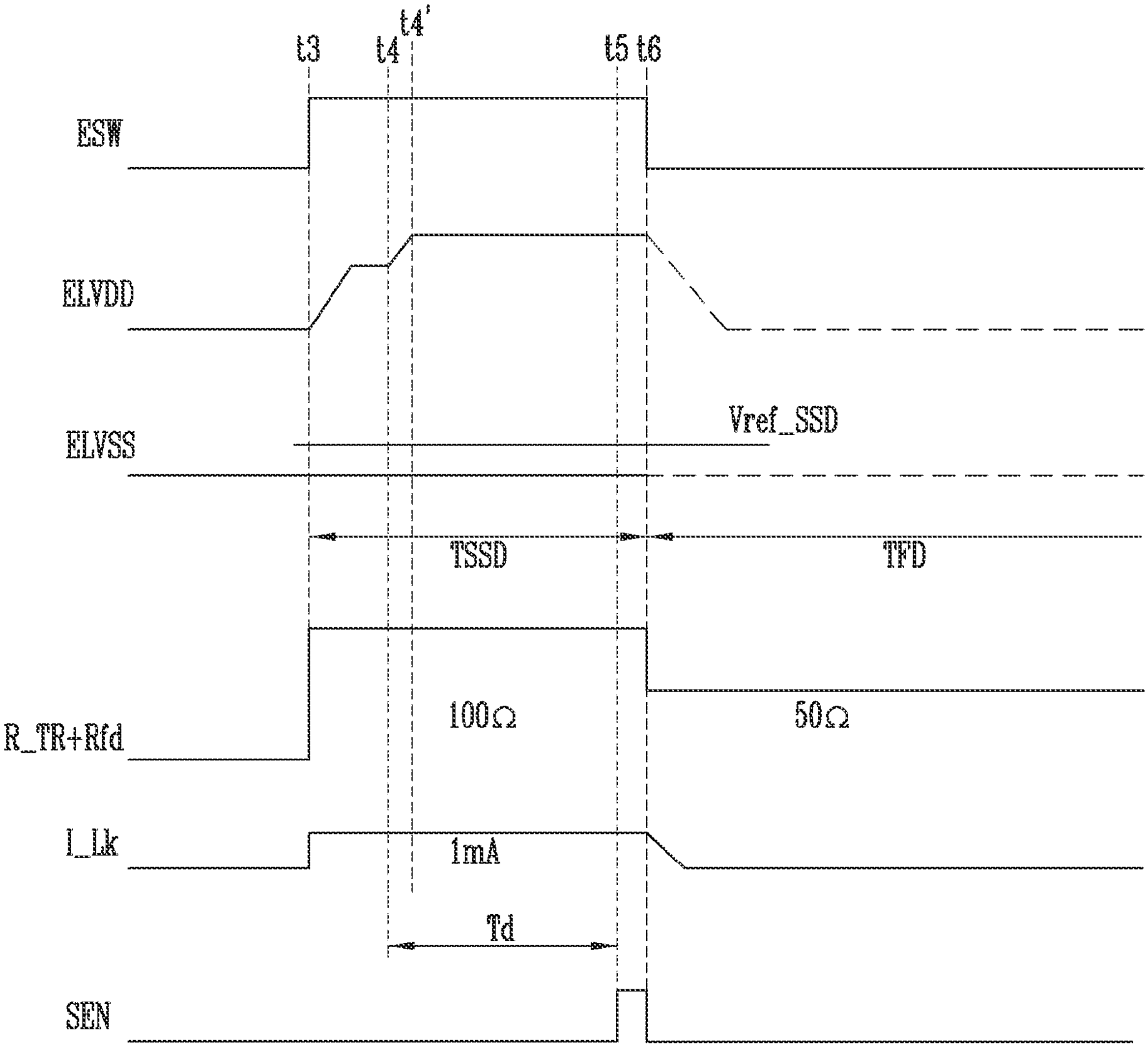
FIG. 16 is a drawing illustrating an effect when a power provider is configured with a variable resistance.

FIG. 15 is a drawing illustrating a driving method of a power provider when a short circuit occurs in a display panel. FIG. 15 illustrates a problem when the power provider 60 is configured with a fixed resistance Rfx instead of the variable resistance Rfd. FIG. 16 is a drawing illustrating an effect when a power provider is configured with a variable resistance. In FIG. 15, the fixed resistance Rfx may replace the variable resistance Rfd shown in FIG. 12, but other than the fixed resistance Rfx, the power provider of FIG. 15 may be assumed to have the same or substantially the same structure as that of the power provider 60 shown in FIG. 12.

Referring to FIG. 12 and FIG. 15, the delay part 64*c* of the short circuit detecting circuit 64 may delay the first pre-charge end signal SPE1 by the delay period (e.g., the predetermined delay period) Td from the time point t4 at which the first pre-charge end signal SPE1 is received, to generate the sensing enable signal SEN at the time point t5. When the comparator 64*a* activated by the sensing enable signal SEN at the time point t5 determines that the level of the sensing voltage ELVSS measured at the second power line ELVSSL is greater than the level of the reference short circuit voltage Vref_SSD, the short circuit detecting circuit 64 may stop the operation of the first and second power converters 61 and 62 at the time point t6. For example, the level of the reference short circuit voltage Vref_SSD may be 100 mV. In this case, the first and second power converters 61 and 62 may output the voltage having the ground level.

The power provider 60 may include the capacitor C connected between the second power line ELVSSL and ground. The leakage current I_Lk may be discharged to ground via the short circuit resistance R_DP, the control transistor TRfd, and the fixed resistance Rfx of the display panel 50.

When the power provider 60 is powered off, the voltage of the second power line ELVSSL may be discharged during the discharge period TFD. For convenience of illustration, FIG. 15 shows that the first control signal ESW has an enable level (e.g., a logic high level) even after the power provider 60 is powered off. However, when the power provider 60 is powered-off, as shown in FIG. 16, the first control signal ESW may be transitioned from the enable level (e.g., the logic high level) to a disable level (e.g., a logic low level).

The length of the discharge period TFD may be set so that the voltage of the second power line ELVSSL may be discharged during one frame. For example, when the driving frequency is 60 Hz, the length of the discharge period TFD may be set to 10 ms, which may be smaller than 16.7 ms corresponding to the length of one frame period. The length of the discharge period TFD may be proportional to a product of the capacitance of the capacitor C and the equivalent resistance obtained by adding the resistance R_TR of the control transistor TRfd and the fixed resistance Rfx. In other words, as the capacitance of the capacitor C or the equivalent resistance obtained by adding the resistance R_TR of the control transistor TRfd and the fixed resistance Rfx increases, the length of the discharge period TFD may increase.

The capacitance of the capacitor C may be increased according to a specification used by the display device 1000. Therefore, it may be desired to design the equivalent resistance value, which is the sum of the resistance R_TR of the control transistor TRfd and the fixed resistance Rfx, to decrease in response to an increase in the capacitance of the capacitor C.

For example, when the short circuit resistance R_DP is 2250Ω, the equivalent resistance value of the sum of the resistance R_TR of the control transistor TRfd and the fixed resistance Rfx is 50Ω, and the first power voltage ELVDD is 4.6 V, according to Ohm's law, the leakage current I_Lk may be 2 mA. In this case, the level of the reference short circuit voltage Vref_SSD may be 100 mV.

On the other hand, when the display device 1000 uses a capacitor C that is twice as large as the capacitance of the capacitor C used in the above described example, the same discharge period TFD as that in the above described example may be maintained by having the equivalent resistance value as 25Ω, which is the sum of the resistance R_TR of the control transistor TRfd and the fixed resistance Rfx in the above described example that is decreased in half.

However, when the equivalent resistance value, which is the sum of the resistance R_TR of the control transistor TRfd and the fixed resistance Rfx, is decreased in half, the leakage current I_Lk is increased to 4 mA according to Ohm's law. In other words, when the short circuit detecting circuit 64 operates while the level of the sensing voltage ELVSS measured at the second power line ELVSSL is greater than the level of the reference short circuit voltage Vref_SSD (for example, such as 100 mV), even if the leakage current I_Lk of 2 mA or more and less than 4 mA flows, the enable level short circuit sensing signal SSD may not be output. When the power provider 60 does not sense the leakage current I_Lk of 2 mA or more and less than 4 mA and continues to operate, a lifespan of an external power source (e.g., a battery) may be reduced.

The embodiment shown in FIG. 16 may be different from the embodiment shown in FIG. 15, in that in FIG. 15, the resistance values in the short circuit sensing period TSSD and the discharge period TFD are the same or substantially the same as each other, whereas in FIG. 16, the resistance value in the short circuit sensing period TSSD may be different from the resistance value in the discharge period TFD. Accordingly, redundant description therebetween may not be repeated.

Referring to FIG. 15 and FIG. 16, the power provider 60 may be powered off at the time point t6. In this case, the first control signal ESW may transition from the enable level (e.g., the logic high level) to the disable level (e.g., the logic low level). For reference, FIG. 16 illustrates an embodiment in which it is assumed that the power provider 60 is powered off at the time point t6 before the second power voltage ELVSS transitions to the target second power voltage ELVSS (e.g., refer to FIG. 14), such that a comparison with the embodiment illustrated in FIG. 15 may be facilitated.

The equivalent resistance value of the sum of the resistance R_TR of the control transistor TRfd and the variable resistance Rfd of the second power converter 62 may be greater in the short circuit detecting period TSSD than that of the discharge period TFD. For example, the equivalent resistance value of the sum of the resistance R_TR of the control transistor TRfd and the variable resistance Rfd may be 100Ω in the short circuit detecting period TSSD, and may be 50Ω in the discharge period TFD.

The equivalent resistance value of the sum of the resistance R_TR of the control transistor TRfd and the variable resistance Rfd of FIG. 16 may be implemented to have the series connection structure shown in FIG. 13A. The variable resistance Rfd in the short circuit detecting period TSSD may correspond to the case in which the first switch SW1 of FIG. 13A is in a turned-off state, and the variable resistance Rfd in the discharge period TFD may correspond to the case in which the first switch SW1 of FIG. 13A is in a turned-on state.

As described above, when the equivalent resistance value of the sum of the resistance R_TR of the control transistor TRfd and the variable resistance Rfd is greater in the short circuit detecting period TSSD than that of the discharge period TFD, the leakage current I_Lk may be reduced. As an example, when the equivalent resistance value of the sum of the resistance R_TR of the control transistor TRfd and the variable resistance Rfd is 100Ω in the short circuit detecting period TSSD, the leakage current I_Lk may be 1 mA. Accordingly, a life-span of an external power source (e.g., a battery) may be improved.

In addition, when the equivalent resistance value of the sum of the resistance R_TR of the control transistor TRfd and the variable resistance Rfd is greater in the short circuit detecting period TSSD than that of the discharge period TFD, and when a short circuit occurs in the second power line ELVSSL, even with a low leakage current I_Lk, the level (e.g., 100 mV) of the reference short circuit voltage Vref_SSD may be easily reached. Accordingly, as the driving frequency of the display device 1000 increases, even if the period of one frame decreases, the short circuit detecting circuit 64 may stably operate.

On the other hand, when the equivalent resistance value of the sum of the resistance R_TR of the control transistor TRfd and the variable resistance Rfd is smaller in the discharge period TFD than that of the short circuit detecting period TSSD, the length of the discharge period TFD may be reduced. As described above, this is because the length of the discharge period TFD may be proportional to a value obtained by multiplying the capacitance of the capacitor C and the equivalent resistance value of the sum of the resistance R_TR of the control transistor TRfd and the variable resistance Rfd.

Figure 17A:
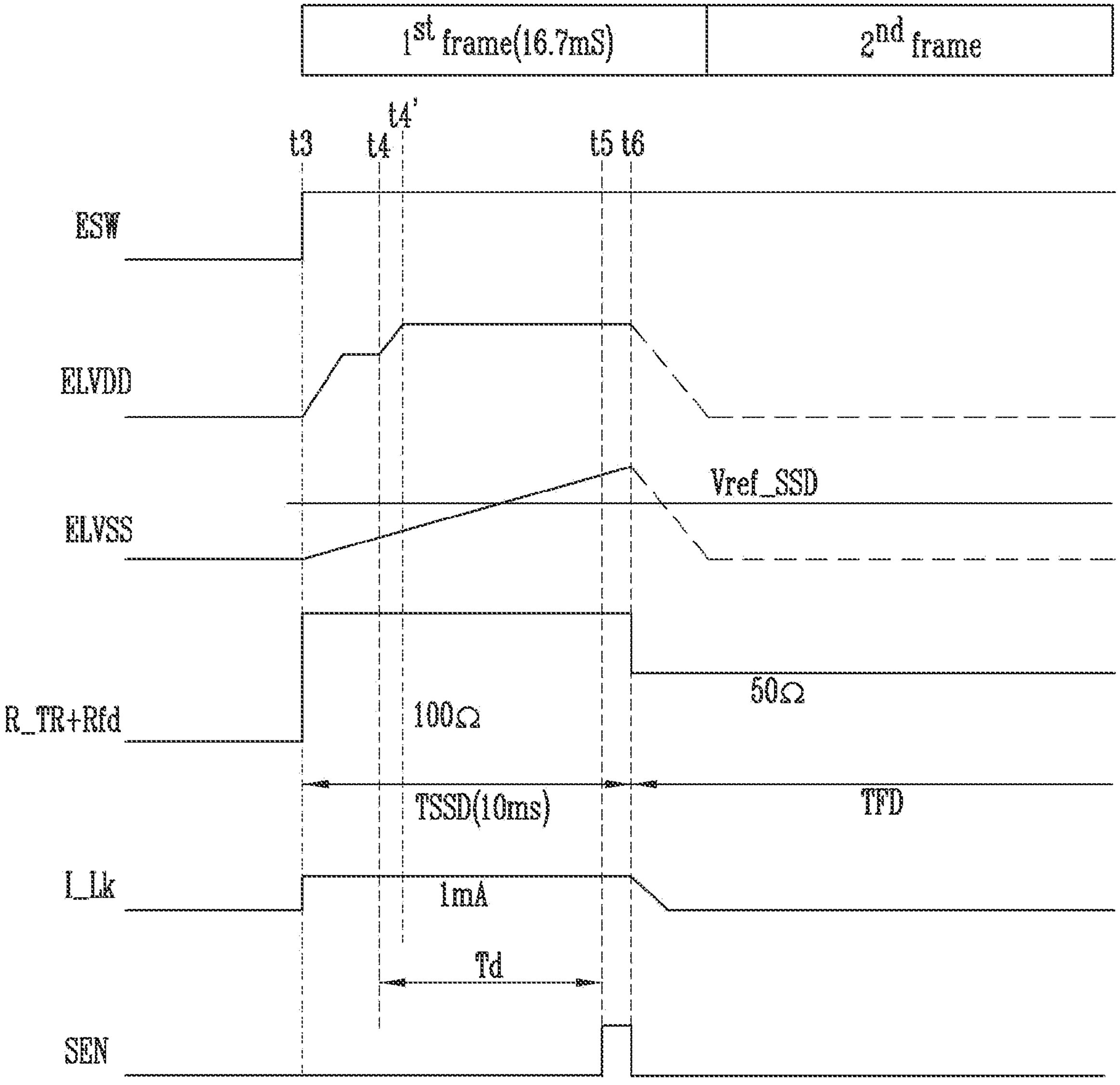
FIG. 17A is a drawing illustrating a driving method of a power provider when a short circuit occurs in a display panel in a normal driving mode.
Figure 17B:
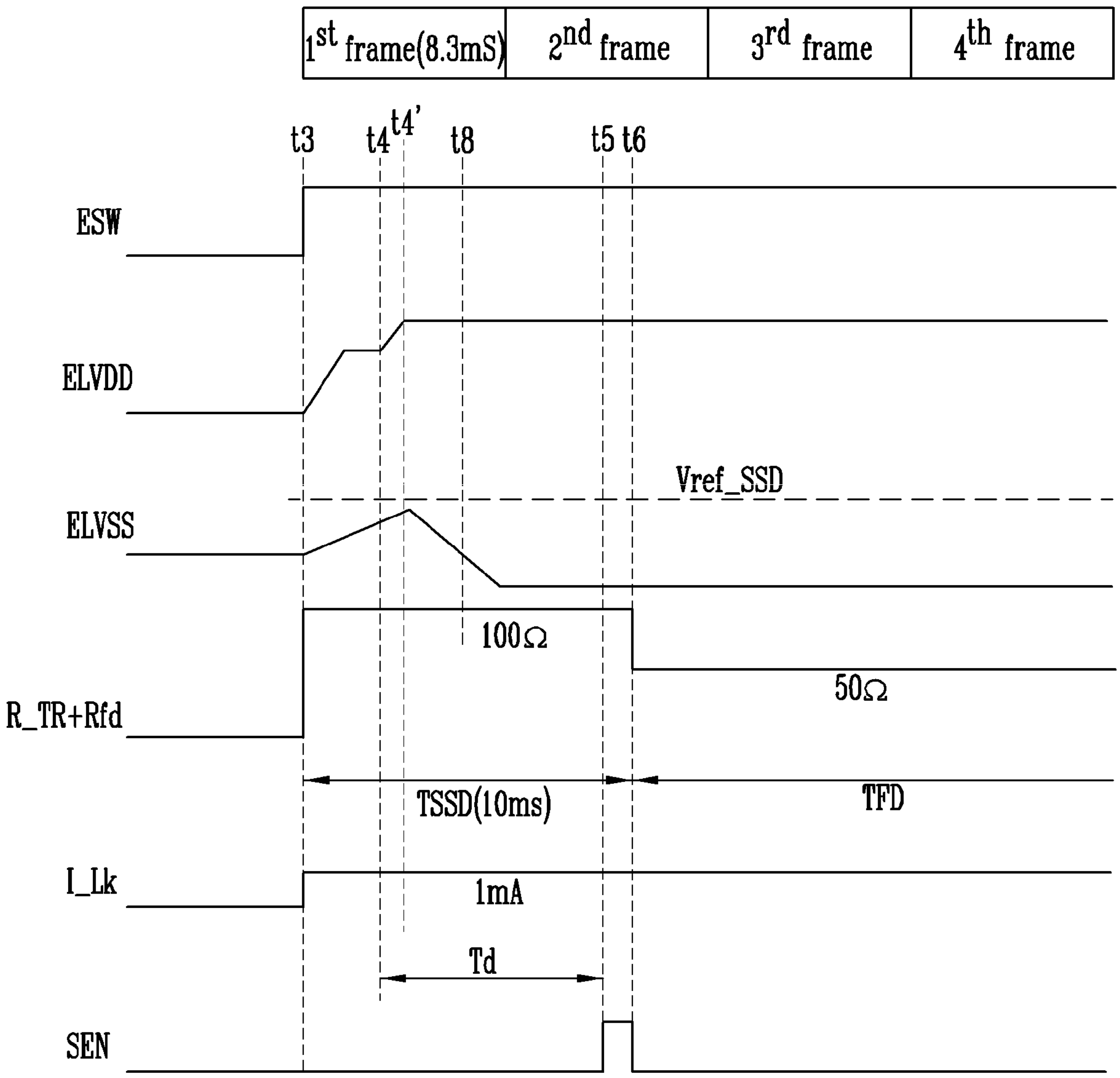
FIG. 17B is a drawing illustrating a problem when the driving method of the power provider shown in FIG. 17A operates in a high frequency driving mode.
Figure 18:
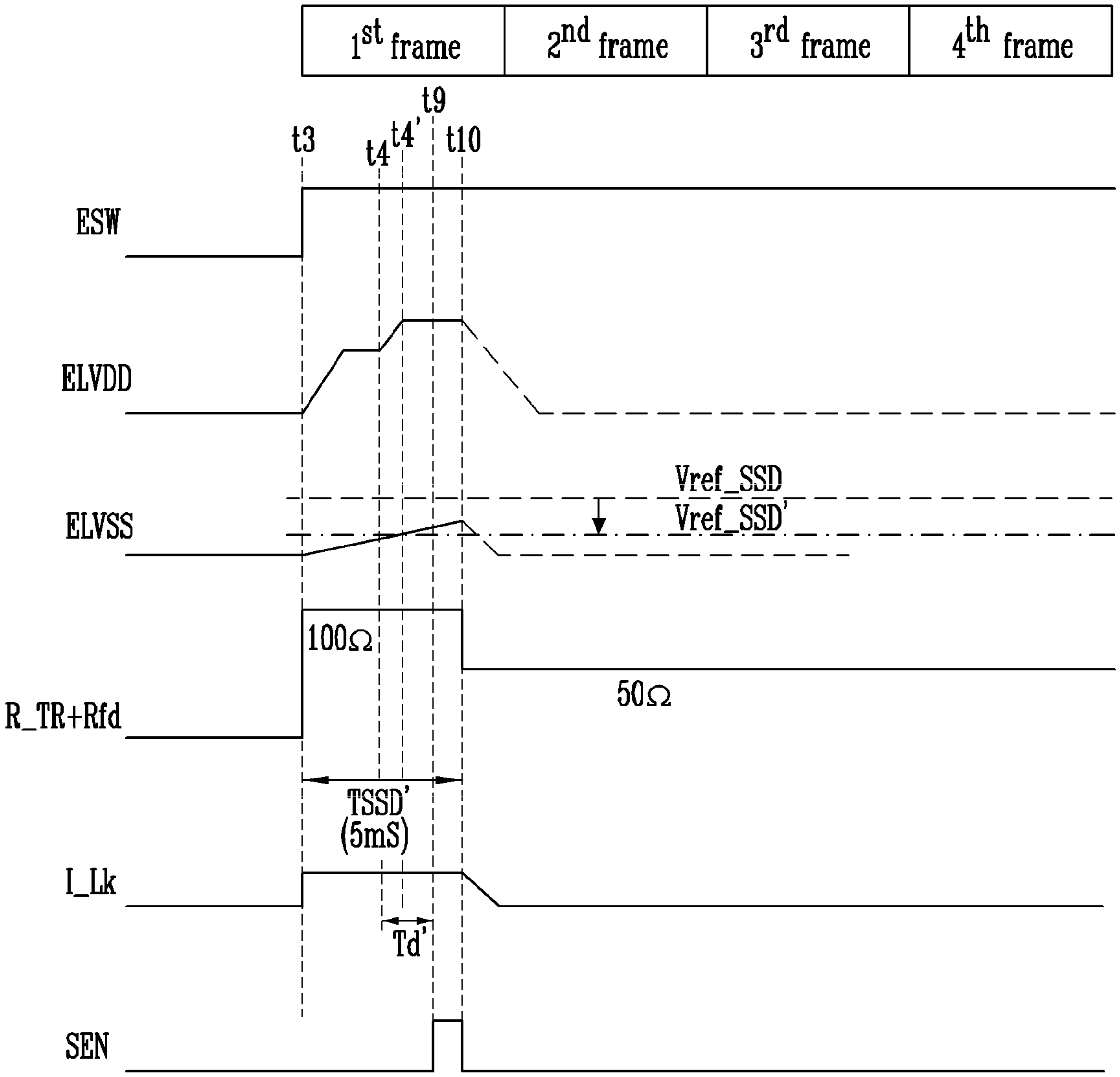
FIG. 18 is a drawing illustrating a driving method of a power provider when a short circuit occurs in a display panel in a high frequency driving mode.

FIG. 17A is a drawing illustrating a driving method of a power provider when a short circuit occurs in a display panel in a normal driving mode. FIG. 17B is a drawing illustrating a problem when the driving method of the power provider shown in FIG. 17A operates in a high frequency driving mode. FIG. 18 is a drawing illustrating a driving method of a power provider when a short circuit occurs in a display panel in a high frequency driving mode. FIG. 19 is a lookup table corresponding to a short circuit detecting period and a reference short circuit voltage level for various driving frequencies according to an embodiment.

Referring to FIG. 1, FIG. 3 to FIG. 7, and FIG. 12 to FIG. 17A, the display device 1000 may operate by varying the driving frequency. According to an embodiment, the display device 1000 may be driven at 60 Hz in the normal driving mode. In this case, the period of one frame may be about 16.7 ms. However, the present disclosure is not limited thereto, and the driving frequency of the display device 1000 in the normal driving mode may be variously modified as needed or desired.

The delay part 64*c* of the short circuit detecting circuit 64 may generate the sensing enable signal SEN at the time point t5 by delaying the delay period (e.g., the predetermined delay period) Td from the time point t4 at which the first pre-charge end signal SPE1 is received. When the comparator 64*a* activated by the sensing enable signal SEN at the time point t5 determines that the level of the sensing voltage ELVSS measured at the second power line ELVSSL is greater than the level of the reference short circuit voltage Vref_SSD, the short circuit detecting circuit 64 may stop the operation of the first and second power converters 61 and 62 at the time point t6. In this case, the first and second power converters 61 and 62 may output the voltage of the ground level from the time point t6.

The short detecting period TSSD may correspond to a period from the time point t3 at which the first control signal ESW is applied to the time point t6 at which the sensing enable signal SEN is terminated. Accordingly, the length of the short circuit detecting period TSSD may increase or decrease in proportion to the length of the delay period Td. The length of the delay period Td may be set in consideration of a time at which the level of the second power voltage ELVSS (or the sensed voltage) measured at the second power line ELVSSL when a short circuit occurs in the second power line ELVSSL reaches the reference short circuit voltage Vref_SSD.

According to an embodiment, in the normal driving mode, the length of the short circuit detecting period TSSD may be 10 ms. In this case, because the period of one frame in the normal driving mode is about 16.7 ms, the short circuit detecting period TSSD may be sufficiently secured within the period of one frame, so that the short circuit detecting circuit 64 may normally operate.

Referring to FIG. 17B, in a case in which the display device 1000 operates in the high frequency driving mode, for example, the driving frequency may be 120 Hz. The duration of one frame may be about 8.3 ms. However, the present disclosure is not limited thereto, and the driving frequency of the display device 1000 in the high frequency driving mode may be variously modified as needed or desired. In other words, the display device 1000 may set the driving frequency faster in the high frequency driving mode than in the normal frequency mode.

Even though the display device 1000 is changed to the high frequency driving mode such that the driving frequency is changed from 60 Hz to 120 Hz, when the length of the short circuit detecting period TSSD is fixed to 10 ms, even though a short circuit occurs in the second power line ELVSSL such that the second power voltage ELVSS (or the sensed voltage) increases, because the second power converter 62 starts to output the second power voltage ELVSS at the time point t8 before reaching the reference short circuit voltage Vref_SSD, the short circuit detecting circuit 64 may not sense a short circuit generated in the second power line ELVSSL. Accordingly, the first power converter 61 and the second power converter 62 may continue to output the first power voltage ELVDD and the second power voltage ELVSS, respectively, so that a life-span of an external power source (e.g., a battery) may be reduced.

Referring to FIG. 18, the power provider 60 may change a short circuit detecting period TSSD' and a level of a reference short circuit voltage Vref_SSD' in response to a change in the driving mode of the display device 1000. According to an embodiment, when the display device 1000 is changed from the normal driving mode (e.g., 60 Hz) to the high frequency driving mode (e.g., 120 Hz), the power provider 60 may reduce the short circuit detecting period TSSD', and may reduce the reference short circuit voltage Vref_SSD'. For example, the power provider 60 may reduce the short circuit detecting period TSSD' from 10 ms to 5 ms, and may reduce the reference short circuit voltage Vref_SSD' from 100 mV to 50 mV.

According to an embodiment, the delay part 64*c* of the short circuit detecting circuit 64 may receive the first pre-charge end signal SPE1 at the time point t4, and may output the sensing enable signal SEN at the time point T9 after a delay period (e.g., a predetermined delay period) Td'. Compared with the delay period Td in the normal driving mode shown in FIG. 17A, the delay period Td' in the high frequency driving mode shown in FIG. 18 may be reduced. Accordingly, the short circuit detecting period TSSD' in the high frequency driving mode shown in FIG. 18 may be reduced when compared with the short circuit detecting period TSSD in the normal driving mode shown in FIG. 17A.

According to an embodiment, the timing controller 10 may provide information of the short circuit detecting period TSSD and the reference short circuit voltage Vref_SSD corresponding to the driving frequency to the power provider 60 (or the short circuit detecting circuit 64). The timing controller 10 may store a lookup table LUT (e.g., see FIG. 19) in a separate memory.

Accordingly, because the short circuit detecting period TSSD' (e.g., 5 ms) is smaller than the period of one frame (e.g., 8.3 ms), before the second power converter 62 outputs the second power voltage ELVSS, the short circuit detecting circuit 64 may determine whether the second power line ELVSSL is short-circuited. In addition, an amount of increase in the second power voltage ELVSS (or the sensed voltage) measured at the second power line ELVSSL in which the short circuit occurs may also decrease as much as the short circuit detecting period TSSD' decreases. Correspondingly, because the reference short circuit voltage Vref_SSD' is also adjusted downward, the short circuit detecting circuit 64 may normally determine whether or not the second power line ELVSSL is short-circuited.

Referring to FIG. 19, the lookup table LUT according to an embodiment includes, for various driving frequencies of the display device 1000, a length of the period of one frame, a length of the short circuit detecting period TSSD, the leakage current I_Lk, the equivalent resistance value obtained by adding the resistance R_TR of the control transistor TRfd and the variable resistance Rfd, and the reference short circuit voltage Vref_SSD. In this case, the equivalent resistance value obtained by adding the resistance R_TR of the control transistor TRfd and the variable resistance Rfd may refer to a resistance value during the short circuit detecting period TSSD.

For example, as the driving frequency of the display device 1000 increases to 30 Hz, 60 Hz, 90 Hz, and 120 Hz, the period of one frame may be shortened to 33.4 ms, 16.7 ms, 11.2 ms, and 8.3 ms. Accordingly, the length of the short circuit detecting period TSSD may be decreased to 25 ms, 10 ms, 8 ms, and 5 ms, respectively, and the level of the reference short circuit voltage Vref_SSD may also be decreased to 100 mV, 100 mV, 80 mV, and 50 mV, respectively. In this case, when the driving frequency is 30 Hz, because the length of one frame is 33.4 ms, which is longer than other driving frequencies, the reference short circuit voltage Vref_SSD thereof may be the same or substantially the same as the reference short circuit voltage Vref_SSD of the driving frequency of 60 Hz. Because the equivalent resistance value obtained by adding the resistance R_TR of the control transistor TRfd and the variable resistance Rfd may be equally or substantially equally applied as 100Ω with respect to all of the driving frequencies, the leakage current I_Lk may be constant or substantially constant as 1 mA.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A power provider comprising:

a first power converter configured to convert an input voltage, and output a first power voltage to a display panel through a first power line;

a second power converter configured to convert the input voltage, and output a second power voltage to the display panel through a second power line; and a short circuit detecting circuit configured to detect a short-circuit of the first power line and the second power line in the display panel, by determining whether or not a level of a sensed voltage measured at the second power line is greater than or equal to a reference short circuit voltage level in response to a sensing enable signal output during a short circuit detecting period, wherein the short circuit detecting circuit is configured to vary a length of the short circuit detecting period and the reference short circuit voltage level in response to a driving frequency, and wherein the short circuit detecting circuit is configured to delay the output of the sensing enable signal based on a first pre-charge end signal.

2. The power provider of claim 1, wherein the first power converter comprises:

a boost converter configured to receive the input voltage from a first input terminal, and output the first power voltage to a first output terminal;

a switch connected between the first input terminal and the first output terminal; and a soft start controller configured to control the switch based on a first control signal.

3. The power provider of claim 2, wherein the soft start controller is configured to turn on the switch when the first control signal is received, and output the first pre-charge end signal at a time point at which the switch is turned off.

4. The power provider of claim 3, wherein the second power converter comprises a control transistor and a variable resistance connected in series between a second output terminal and ground, the second output terminal being connected to the second power line.

5. The power provider of claim 4, wherein an equivalent resistance has a larger resistance in the short circuit detecting period than that of a discharge period in which a voltage of the second power line is discharged to ground during power-off, the equivalent resistance corresponding to a sum of a resistance of the control transistor and the variable resistance.

6. The power provider of claim 4, wherein the variable resistance comprises:

a first resistance and a second resistance connected in series; and a first switch connected to opposite ends of the second resistance in parallel with the second resistance.

7. The power provider of claim 6, wherein the first switch is configured to be turned off during the short circuit detecting period, and turned on during a discharge period.

8. The power provider of claim 4, wherein the variable resistance comprises:

a third resistance and a fourth resistance connected in parallel; and a second switch connected between one end of the third resistance and one end of the fourth resistance.

9. The power provider of claim 8, wherein the second switch is configured to be turned off during the short circuit detecting period, and turned on during a discharge period.

10. The power provider of claim 4, wherein the second power converter further comprises a diode between the second output terminal and ground.

11. The power provider of claim 3, wherein the short circuit detecting circuit comprises:

a comparator configured to receive the sensed voltage and the reference short circuit voltage, and output a logic high level signal when the level of the sensed voltage is greater than the reference short circuit voltage level;

a short circuit detecting controller configured to provide a voltage of a turn-on level to a gate electrode of a control transistor when the logic high level signal is received; and a delay part configured to receive the first pre-charge end signal from the first power converter.

12. The power provider of claim 11, wherein the delay part is configured to delay the first pre-charge end signal by a delay period to output the sensing enable signal.

13. The power provider of claim 12, wherein the comparator is configured to compare the level of the sensed voltage with the reference short circuit voltage level when the sensing enable signal is received.

14. The power provider of claim 13, wherein the reference short circuit voltage level is decreased when the driving frequency increases.

15. The power provider of claim 12, wherein the delay part is configured to decrease the delay period when the driving frequency increases.

16. The power provider of claim 12, wherein the short circuit detecting period is defined as a period from a time point at which the first control signal is applied to a time point at which the sensing enable signal ends.

17. A display device comprising:

a display panel comprising:

scan lines;

a first power line;

a second power line; and pixels connected to the scan lines, the first power line, and the second power line;

a scan driver configured to sequentially output scan signals to the scan lines; and a power provider comprising:

a first power converter configured to convert an input voltage to output a first power voltage to the display panel through the first power line;

a second power converter configured to convert the input voltage to output a second power voltage to the display panel through the second power line; and a short circuit detecting circuit configured to detect a short-circuit of the first power line and the second power line in the display panel, by determining whether or not a level of a sensed voltage measured at the second power line is greater than or equal to a reference short circuit voltage level in response to a sensing enable signal output during a short circuit detecting period, wherein the short circuit detecting circuit is configured to vary a length of the short circuit detecting period and the reference short circuit voltage level in response to a driving frequency, and wherein the short circuit detecting circuit is configured to delay the output of the sensing enable signal based on a first pre-charge end signal.

18. The display device of claim 17, wherein the second power converter comprises a control transistor and a variable resistance connected in series between a second output terminal and ground, the second output terminal being connected to the second power line.

19. The display device of claim 18, wherein an equivalent resistance has a larger resistance in the short circuit detecting period than that of a discharge period in which a voltage of the second power line is discharged to ground during power-off of the power provider, the equivalent resistance corresponding to a sum of a resistance of the control transistor and the variable resistance.

20. The display device of claim 19, wherein the short circuit detecting circuit is configured to decrease a length of the short circuit detecting period and decreases the reference short circuit voltage level, when the driving frequency increases.

* * * * *